US008955104B2

(12) United States Patent
Arbaugh et al.

(10) Patent No.: US 8,955,104 B2
(45) Date of Patent: Feb. 10, 2015

(54) METHOD AND SYSTEM FOR MONITORING SYSTEM MEMORY INTEGRITY

(75) Inventors: William A. Arbaugh, Ellicott City, MD (US); Nick Louis Petroni, Jr., Glassboro, NH (US); Timothy Jon Fraser, Redmond, WA (US); Jesus Maria Molina-Terriza, Washington, DC (US)

(73) Assignee: University of Maryland College Park, College Park, MD (US)

( * ) Notice: Subject to any disclaimer, the term of this patent is extended or adjusted under 35 U.S.C. 154(b) by 1577 days.

(21) Appl. No.: 11/658,806

(22) PCT Filed: Jul. 6, 2005

(86) PCT No.: PCT/US2005/024127
§ 371 (c)(1),
(2), (4) Date: Apr. 15, 2009

(87) PCT Pub. No.: WO2006/014554
PCT Pub. Date: Feb. 9, 2006

(65) Prior Publication Data
US 2009/0217377 A1    Aug. 27, 2009

Related U.S. Application Data

(60) Provisional application No. 60/586,017, filed on Jul. 7, 2004.

(51) Int. Cl.
*G06F 11/30* (2006.01)
*G06F 11/34* (2006.01)
(52) U.S. Cl.
CPC .......... *G06F 11/348* (2013.01); *G06F 11/3495* (2013.01)
USPC ................... 726/22; 726/23; 726/24; 726/25; 713/164; 713/165; 713/166; 713/167; 713/187; 713/188

(58) Field of Classification Search
CPC .................................................. H04L 12/2602
USPC .............. 726/22–26; 713/187–188, 164–167
See application file for complete search history.

(56) References Cited

U.S. PATENT DOCUMENTS 5,768,550 A * 6/1998 Dean et al. .................... 710/305
5,924,093 A 7/1999 Potter et al.
(Continued)

OTHER PUBLICATIONS

Xiaolan Zhang, Secure Coprocessor—based Intrusion detection, 2002, ACM.*
David Nagle, Design Tradeoffs for Software Managed-TLBs, 1993, ACM.*

(Continued)

*Primary Examiner* — Josnel Jeudy

(57) ABSTRACT

A host system integrity monitor for monitoring memory, operating systems, applications, domain manager, and other host system's structures of interest is isolated and independent of the CPU and operating system of commodity systems. The system requires no modifications to the protected (monitored) host's software, and operates correctly even when the host system is compromised. Either arranged as a stand-alone computer on the add-in card which communicates with the monitored host system through the PCI bus, or as the co-processor based monitor located on the motherboard of the host system, or residing on one of the virtual CPU while the monitored system resides on another virtual CPU, or residing within the domain manager of the host system, the monitor monitors the integrity of the examined structure by calculating hash values of the structure, comparing them with expected hash values, and sending error reports once the discrepancy between these values is detected.

31 Claims, 16 Drawing Sheets

(56) References Cited

U.S. PATENT DOCUMENTS

| | | | |
|---|---|---|---|
| 6,877,081 B2* | 4/2005 | Herger et al. | 711/170 |
| 6,889,167 B2* | 5/2005 | Curry, III | 702/183 |
| 6,934,855 B1* | 8/2005 | Kipnis et al. | 726/20 |
| 7,457,951 B1* | 11/2008 | Proudler et al. | 713/164 |
| 2002/0029308 A1 | 3/2002 | Babaian et al. | |
| 2003/0055864 A1* | 3/2003 | Armstrong et al. | 709/107 |
| 2003/0084337 A1* | 5/2003 | Simionescu et al. | 713/200 |
| 2006/0005188 A1 | 1/2006 | Vega et al. | |
| 2007/0006307 A1 | 1/2007 | Hahn et al. | |
| 2007/0067623 A1 | 3/2007 | Ward | |
| 2007/0073999 A1 | 3/2007 | Verheyen et al. | |
| 2007/0100994 A1* | 5/2007 | Armstrong et al. | 709/224 |

OTHER PUBLICATIONS

Brumley, D.; "Invisible Intruders: Rootkits in Practice";—;login:—http://www.usenix.org/publications/login/1999-9/features/rootkits.html, 1999.

Jones, K.; "Loadable kernel modules";—;login:—http://www.usenix.org/publications/login/2001-11/pdfs/jones2.pdf; Nov. 2001.

Kim, G. et al.; "The Design and Implementation of Tripwire: A File System Integrity Checker"; Proc. of the Second ACM Conf. on Computer and Communications Security; pp. 18-29; Nov. 1994.

Molina, J.; "Using Independent Auditors as Intrusion Detection Systems"; Lecture Notes in Computer Science; vol. 2513; Proceedings of the 4th International Conference on Information and Communications Security; pp. 291-302; 2002.

* cited by examiner

METHOD AND SYSTEM FOR MONITORING SYSTEM MEMORY INTEGRITY

This Utility Patent Application is based on Provisional Patent Application #60/586,017, filed on 7 Jul. 2004.

This invention was made with government support under Contract Number MDA 90402C0428 awarded by the National Security Agency, Contract Number ANI0113092 awarded by the National Science Foundation and Contract F306020120535 awarded by the Defense Advanced Research Projects Agency. The government has certain rights in the invention.

FIELD OF THE INVENTION

The present invention relates to computer security and in particular, to the monitoring of the integrity of computer system memories. The subject system is designed to detect modifications to system structures in the memory, such as for example, operation systems (kernels), applications, and domain managers, etc., irrespective of the nature and extent of the modifications.

In overall concept, the present invention is directed to a system memory monitor which is independent of the monitored structure, such as, for example, the kernel of the monitored operating system in the system memory whereby operation is maintained even when the host kernel has been thoroughly compromised. The independence of the system memory integrity monitor from the modifications made to the host's memory may be provided by locating the system memory integrity monitor in a processor (physically or virtually) independent of the host processor so that the monitor operates independently of the monitored system.

Further, the present invention is directed to system memory monitoring architecture in which the monitor is connected to an administrative system through an independent communication link to transmit reports on a monitored structure independent of the state of the monitored host system, thus avoiding communication of deceptive information to the administrative system if the host system resources have been compromised whether maliciously or otherwise.

BACKGROUND OF THE INVENTION

One of the fundamental goals of computer security is to ensure the integrity of system resources, including memory and systems in the memory, such as operating systems, applications, domain manager, etc. The kernel is a program that constitutes the central core of the operating system by assuming complete control over substantially all that occurs in such a system. The kernel itself does not interact directly with the user, but rather interacts with the shell and other programs as well as with the hardware devices in the system including the processor (CPU), memory and disk drives. The kernel provides basic services for all portions of the operating system such as memory management, process management, tile management, as well as input/output management.

Due to the fact that all user applications rely on the integrity of the kernel and core system utilities, the compromise of any one portion of the system may result in a complete lack of reliability in the system as a whole. Particularly in the case of commodity operating systems, the ability to place assurance on the numerous and complex portions of the system has been found to be exceedingly difficult. The most important pieces of this complex system reside in the core of the kernel itself. While a variety of tools and architectures have been developed for the protection of kernel integrity on commodity systems, most have a fundamental flaw—they rely on some portion of kernel correctness to remain trustworthy themselves. In a world of increasingly sophisticated attackers this assumption is frequently invalid.

There is therefore a growing need for integrity protection which does not rely on kernel or other system resources correctness and which is able to effectively detect modifications to the kernel including the presence of rootkits.

Rootkits are collections of programs that enable attackers who have gained administrative control of a host to modify the host's software, usually causing it to hide their presence from the host's genuine administrators. Currently, there are twelve commonly used publicly known rootkits. Every popular rootkit soon encourages the development of a program designed to detect it. Every new detection program inspires rootkit authors to find better ways to hide. However, in this race, the rootkit designers have traditionally held the advantage: the most sophisticated rootkits modify the operating system kernel of the compromised host to secretly work on behalf of the attacker. When an attacker can arbitrarily change the functionality of the kernel, no user program that runs on the system can be trusted to produce correct results which includes user programs for detecting rootkits.

TABLE 1

| rootkit name | loads via | overwrites syscall jump | adds new syscall jump | modifies kernel text | adds hook to/proc | adds inet protocol |
|---|---|---|---|---|---|---|
| Complete rootkits: | | | | | | |
| adore 0.42 | LKM | x | | | | |
| knark 2.4.3 | LKM | x | | | x | x |
| rial | LKM | x | | | | |
| rkit 1.01 | LKM | x | | | | |
| SucKIT 1.3b | kmem | x | x | | | |
| synapsys 0.4 | LKM | x | | | | |
| Demonstrates module or process hiding only: | | | | | | |
| modhide1 | LKM | x | | | | |
| phantasmagoria | LKM | | | x | | |
| phide | LKM | x | | | | |
| Demonstrates privilege escalation backdoor only: | | | | | | |
| kbd 3.0 | LKM | x | | | | |
| taskigt | LKM | | | | x | |

TABLE 1-continued

| rootkit name | loads via | overwrites syscall jump | adds new syscall jump | modifies kernel text | adds hook to/proc | adds inet protocol |
|---|---|---|---|---|---|---|
| Complete rootkits: | | | | | | |
| Demonstrates key logging only: | | | | | | |
| Linspy v2beta2 | LKM | | x | | | |

Rootkits can be partitioned into two classes: those that modify the host operating system kernel and those that do not. Those in the second class are simpler and easier to detect. These simple rootkits replace critical system utilities such as ps. ls. and netstat with modified versions that deceptively fail to report the presence of an attacker's processes, files, and network connections.

However, since the operating system kernel is not part of the deception, a suspicious administrator can detect the presence of these simple rootkits by comparing the output of the modified utilities against the output of unmodified versions obtained from read-only installation media or against information provided directly by the operating system kernel via the /proc files system (D. Brumley, Invisible Intruders: Rootkits in Practice; login: USENIX and SAGE, September, 1999). Additionally, defensive software is available which monitors the files containing a host's critical system utilities for the kinds of unexpected changes caused by a simple rootkit installation. (G. H. Kim and E. H. Spafford. The Design and Implemention of Tripwire: A File System Integrity Checker. In Proceedings of the $2^{nd}$ ACM Conference on Computer and Communications Security, Pages 18-19, Fairfax, Va., November 1999; and J. Molina and W. A. Arbaugh. Using Independent Auditors as Intrusion Detections Systems in Proceedings of the $4^{th}$ International Conference on Information and Communications Security, pp. 291-302, Singapore, December 2002.)

There is a continuing and ongoing race between developers of complex rootkit detection tools that depend on at least some part of the kernel remaining unmodified and developers of rootkits who respond by increasing the scope of their modifications.

Therefore, kernels and other critical system utility monitors are needed which are designed to detect the more complex class of rootkits that modify the host operating system kernel which provide deceptive information. This monitor demonstrates a means of escaping this race by making its software independent on the health of the host operating system kernel being monitored and isolating it from the reach of an attacker. Known detection techniques fail when run on a sufficiently modified kernel such that when the kernel itself is providing incorrect information even correct system utilities can do nothing but pass this false information on to the user.

The example rootkits in Table 1 (Features of example Linux or kernel-modifying rootkits) provide a variety of services. Nearly all are designed to make the kernel return incorrect or incomplete information when queried by user-mode programs in order to hide the presence of the rootkit and the attacker's processes and files. Some of them also provide backdoors allowing remote access to the compromised system or provide a means of privilege escalation to local users with some of the example rootkits providing keystroke loggers.

The rootkits in the "complete rootkits" section of Table 1 provide a sufficient amount of deceptive functionality that they might be of use to an actual attacker. The remaining rootkits provide only limited functionality and serve only to demonstrate how a particular aspect of rootkit functionality may be implemented.

The check boxes in the Table 1 identify the means by which attackers load the rootkits into the kernel and the means by which the rootkits cause the kernel to execute their functions.

It is known to those skilled in computer arts' that monolithic kernels which have traditionally been used by Unix and Linux contain all the operating system core functions and the device drivers (from all programs that allow the operating system to interact with hardware devices). Modern monolithic kernels feature the ability to load modules at run-time thus allowing easy extension of the kernel's capabilities as required.

The column "loads via" of Table 1 shows that all but one of the example rootkits are implemented as LKMs (Loadable Kernel Modules) and are designed to be loaded through the kernel's LKM-loading interface as if they were device drivers. This fact is significant since an unmodified kernel will report the presence of all loaded LKMs. A stealthy rootkit must take means to modify the kernel or its LKM management data structures to avoid being revealed in these reports. The LKM-loading interface is not the only means of loading a rootkit into the kernel. The SucKIT rootkit is designed to be written into kernel memory via the kernel's /dev/kmem interface using a user-mode loading program provided with the rootkit. (The /dev/kmem interface provides privileged processes with direct access to kernel memory as if it were a file.) This loading method does not use the kernel's LKM-loading interface and consequently leaves no trace in its data structures.

The remaining columns of Table 1 show that the example rootkits use a variety of means to cause the kernel to execute their code. Nearly all of them overwrite the addresses of some of the kernel's system call handling functions in the system call table with the addresses of their own doctored system call handling functions. System calls is a specified set of program interfaces through which application programs or other parts of the operating system request the kernel's services. The act of system call interposition causes the kernel to execute the rootkit's doctored system call handling functions rather than its own when a user program makes a system call.

The rootkit's doctored functions may implement deceptive functionality in addition to the service normally provided by the system call. For example, rootkits often interpose on the fork system call so that they may modify the kernel's process table data structure in a manner which prevents an attacker's processes from appearing in the user-visible process list whenever the kernel creates a new process. Privilege-escalating backdoors are also common: the rkit rootkit's doctored setuid function resets the user and group identity of processes owned by an unprivileged attacker to those of the maximally-privileged root user.

System call interposition is not the only means by which rootkits cause the kernel to execute their functions. In addition to interposing on existing system calls, the "SucKIT" rootkit adds new system calls into previously empty slots in the kernel's system call table. The "phantasmagoria" rootkit avoids the system call table altogether and modifies the machine instructions at the beginnings of several kernel functions to include jumps to its own functions. The "knark" and "taskigt" rootkits add hooks to the /proc filesystem that cause their functions to be executed when a user program reads from certain /proc entries. The "taskigt" rootkit, for example, provides a hook that grants the root user and group identity to any process that reads a particular /proc entry. The "knark" rootkit also registers its own inet protocol handler which causes the kernel to execute a privileged process running an arbitrary program when the kernel receives certain kinds of network packets.

Existing Detection Software

A number of tools designed to detect kernel modifying rootkits are currently available to system administrators. These software packages make a series of checks on any number of system resources to determine if that system is in an anomalous state. The kernel performs its tasks (e.g., executing processes and handling interrupts) in "kernel space" or kernel memory, whereas everything a user normally does (e.g., writing text in a text editor or running graphical programs) is done in "user space". This separation is made in order to prevent user data and kernel data from interfering with each other and thereby diminishing performance or causing the system to become unstable.

There are generally two categories of kernel-modifying rootkit detectors: those that check for rootkit symptoms by looking for discrepancies that are detectable from user-space and those that analyze kernel memory directly to detect changes or inconsistencies in kernel text and/or data structures. These two types of tools will be referred further herein as "user-space" and "kernel memory" tools respectively. A number of tools can be considered both user-space and kernel memory tools, as they provide detection mechanisms that fall into both categories. Table 2 (kernel-modifying rootkit detector mechanisms) summarizes a representative sample of commonly used rootkit detectors that are able at least to some degree, detect kernel-modifying rootkits. Those tools with an "x" present in the column entitled "User-Space System Detection" perform user-space checks. Those with marks in either of the two leftmost columns analyze kernel memory through specified mechanisms.

Many kernel-modifying rootkits have symptoms that are readily-observable from user-space without accessing kernel memory or data structures directly. For example, as previously described some rootkits add entries of the kernel's /proc files system. Such entries can often be found with standard directory lookups and, many times, even with trusted and non-compromised versions of ls. Similarly, a number of LKM rootkits do a poor job of hiding themselves from simple user queries such as checking for exported symbols in /proc/ksyms. These symbols are part of the rootkit's added kernel text and do not exist in healthy kernels.

TABLE 2

| | Kernel memory access | | | |
|---|---|---|---|---|
| rootkit detector: | /dev/kmem | detector LKM | synchronous detection | user-space symptom detection |
| KSTAT | x | x | | x |
| St. Michael | | x | x | |
| Carbonite | | x | | |
| Samhain | x | | | x |

TABLE 2-continued

| | Kernel memory access | | | |
|---|---|---|---|---|
| rootkit detector: | /dev/kmem | detector LKM | synchronous detection | user-space symptom detection |
| Chkrootkit | | | | x |
| checkps | | | | x |
| Rkscan | | | | x |
| RootCheck | | | | x |
| Rootkit Hunter | | | | x |

User-space checks fall into two categories, either rootkit-specific or non-rootkit specific. The former are efficient at detecting well-known rootkits using simple checks for specific directories, files, kernel symbols, or other attributes of the system. One of the most common rootkit-specific detectors, "chkrootkit", has a set of predetermined tests it performs looking for these attributes and can detect LKM rootkits currently in common use.

Non-rootkit specific checks by user-space tools generally perform two types of tasks. The first task is a simple comparison between information provided through the /proc files system and the same information as determined by system calls or system utilities. One such common check is for process directory entries hidden from ps and the readdir system call. The second common user-space check is for anomalies in the Linux virtual filesystem directory structure. Some rootkits hide directories, resulting in potential discrepancies between parent-directory link counts and the number of actual subdirectories visible by user programs.

While user-space checks may prove useful under certain conditions they generally have two fundamental limitations. The first limitation is due to the fact that they are dependent on interfaces provided by the kernel and the most critical of compromises can be concealed with an advanced kernel-resident rootkit. The second limitation is that most of the symptoms that are detectable from user-space are not general enough to protect against new and unknown rootkits. However, there is a set of tools whose purpose is to protect the kernel in a more general way which is accomplished by watching for rootkits at the point of attack in kernel memory. The mechanism used by these tools to access kernel memory and the short-comings with each approach, and some general insight into the types of checks kernel memory protectors perform, as well as four common tools currently used to detect rootkits using kernel memory will be presented infra herein.

The methods available to rootkit detectors are not unlike those utilized by rootkits themselves. Unfortunately, easy access to kernel memory is a double-edged sword. Although it provides for the convenient extensibility of the Linux kernel through kernel modules, it also provides for the trivial insertion of new kernel code by attackers who have gained root privileges. The two primary access paths to the Linux kernel (LKM-loading interface and the /dev/kmem interface) were described supra in relation to Table 1. The /dev/kmem, allows attackers and protectors alike to write user programs that can arbitrarily change kernel virtual memory. There is much more overhead involved with a program that uses /dev/kmem, since symbols must be ascertained independently (typically from /proc/ksyms or the System.map file) and data structures generally must be processed manually. However, the portability of a tool written in this manner would allow it to work even on kernels built without LKM support. One major drawback which must be considered by authors of tools that use /dev/ kmem is that the interface is provided by the kernel, which is the entity whose integrity they seek to verify. Because the interface is provided by a kernel driver, there is always the potential that a rootkit is providing false information to the user-space tool.

Another method, insertion of an LKM by the tool, may be a far more powerful approach. First, it gives the tool the ability to execute code in the kernel, the privileges of which include the ability to manipulate the scheduler, utilize kernel functions, provide additional interfaces to user-space programs, and have immediate access to kernel symbols. The negatives of using an LKM are twofold. First, the approach clearly will not work in a kernel built without LKM support. Secondly, a rootkit already resident in the kernel could modify, replace, or ignore a module as it sees fit, depending on its sophistication.

Once provided access to kernel memory, tools take a number of approaches to protecting the kernel. First, and perhaps the most well-known, is protection of the system call table described in R. J. Jones, "Loadable Kernel Modules", login: The magazine of USENIX and SAGE, 26(7), November 2001. As shown in Table 1, the vast majority of rootkits utilize system call interposition in one form or another. Rootkit detectors with access to system memory can perform a number of checks on the system call table, the most notable of which is storing a copy or partial copy of the table and the functions to which it points. This copy is then used at a later time to make periodic checks of the table. A similar procedure is also used by some kernel memory-based detectors to check the interrupt descriptor table (IDT), and in one case the entire kernel text.

In addition to protecting text and jump tables within the kernel, detection tools are used to provide information about kernel data that cannot easily be obtained from user-space. Some common examples are the data structures associated with LKMs, files, sockets, and processes, each of which can change frequently in a running kernel. Tools with access to kernel memory can parse and analyze this data in order to look for suspicious or anomalous instances of these objects. User-space tools that use /dev/kmem and LKMs that create new interfaces may compare data obtained directly from the kernel in order to find hidden processes, files, sockets, or LKMs.

Table 3 (kernel-modifying rootkit detector functionality) provides a list of four common kernel memory-based rootkit detection tools. The Table 3 also shows a set of functionality that is common among such detectors, as well as the specific functionality provided by each tool. Each of these four tools examines kernel memory and is briefly described infra herein.

TABLE 3

| Functionality | KSTAT | St. Michael | Carbonite | Samhain |
|---|---|---|---|---|
| Long-term change detection | | | | |
| Hidden LKM detection | x | x | | |
| Syscall table change detection | x | x | | x |
| Syscall function change detection | x | x | | x |
| Kernel text modification detection | | x | | |
| IDT change detection | x | x | | x |
| Short-term system state | | | | |
| Hidden process detection | x | | x | |
| Hidden socket detection | x | | x | |
| Extra features | | | | |
| Hides self from rootkits | | x | | |
| Restore modified text changes | | x | | |

KSTAT is a tool for system administrators, used to detect changes to the interrupt descriptor table (IDT), system call vector, system call functions, common networking functions, and proc filesystem functions. Additionally, it provides an interface for obtaining information about open sockets, loaded kernel modules, and running processes directly from kernel memory. KSTAT relies on /dev/kmem for its checking, but uses LKMs in two ways. First, the initial run of KSTAT on a "clean" kernel uses a module to obtain kernel virtual memory addresses for some of the networking and filesystem functions it protects. Second, due to the fact that the module list head pointer is not exported by the Linux kernel, a "null" module is used to locate the beginning of the module linked list at each check for new modules. Change detection is performed by using "fingerprints" of the original versions. In the case of function protection, this amounts to the copying of a user-defined number of bytes at the beginning of the function. Jump tables (e.g., IDT and system call) are copied in full.

Another tool that uses /dev/kmem for kernel integrity protection is Samhain, a host-based intrusion detection system (IDS) for Unix/Linux. While rootkit detection is not the only function of Samhain, the tool provides IDT, system call table, and system call function protection similar to that of KSTAT. Although it does not perform all of the functionality with regard to kernel state provided by KSTAT, Samhain does have one additional feature, which is the ability to hide itself. An LKM can be loaded to hide process and file information for Samhain so that an attacker might not notice the tool's existence when preparing to install a rootkit. Because of this feature, administrators can prevent attackers with root access from recognizing and killing the Samhain process.

St. Michael tool is likely the most well-known rootkit detector tool available. As part of the St. Jude kernel IDS system, St. Michael attempts to protect kernel text and data from within the kernel itself via an LKM. St. Michael provides most of the same protection as KSTAT and Samhain with a number of added features. First, it replaces copy fingerprints with MD5 or SHA-1 hashes of kernel text and data structures, thereby covering larger segments of that information. Second, St. Michael is the only tool discussed that provides both preventative and reactive measures for kernel modification in addition to its detection features. The former are provided through changes such as turning off write privileges to /dev/kmem and performing system call interposition on kernel module functions in order to synchronously monitor kernel changes for damage. Because of its synchronous nature, St. Michael has a distinct advantage in detection time, to the point that it can actually prevent changes in some cases. The final major advantage of the St. Michael system is its ability to restore certain parts of kernel memory in the case of a detected change. By backing up copies of kernel text, St. Michael provides an opportunity to replace modified code before an attacker utilizes changes made by a rootkit. However, St. Michael has the same disadvantages as any LKM-based tool, as described previously.

Another LKM-based memory, known as Carbonite traces all tasks in the kernel's task list and outputs diagnostic information such as open files, open sockets, environment variables, and arguments. An administrator can then manually audit the output file in search of anomalous entries. Carbonite is a good example of a tool that can be used to produce more specific information after an initial indication of intrusion.

All these Detection tools however disadvantageously depend to a certain degree on the health of the monitored kernel, and therefore may fail to detect malicious modifications if the host's system has been seriously compromised.

SUMMARY OF THE INVENTION

An object of the present invention is to provide a system memory integrity monitor which is independent of the health of the host system resources, wherein the monitor operates based on a processor other than the host processor for access to resources, including main memory, login, address translation, or other tasks. The monitor continues to function effectively and in a trustworthy manner regardless of the running state of the host system, particularly when it has been compromised.

It is another object of the present invention to provide a host memory integrity monitor which is able to access the system's main memory with no limitation to the accessed range of the physical memory and which monitors operating system, applications, domain manager, etc., residing in the memory regardless of the correctness of these monitored system structures.

A further object of the present invention is to provide a host integrity monitor which can securely report the state of the host system to an administrative station. In order to do so, the host integrity monitor does not rely on a possibly compromised host and therefore has its own secure channel to communicate with the administrative station.

It is still a further object of the present invention to provide a coprocessor-based host integrity monitor which is not visible to the host processor, and which does not disrupt the host's normal activities and requires no changes to the host's operating system or system software.

It is also an object of the present invention to provide a host integrity monitor based on a coprocessor (physically or virtually) which is able to process large amounts of memory efficiently (e.g., to have a sufficient processing power), and to have sufficient memory resources, e.g., the coprocessor containing enough long-term storage to maintain a baseline of system state and having sufficient non-system RAM that can be used for coprocessor's own calculations.

In one aspect, the present invention directs itself to a method for monitoring the integrity of the host memory, operation systems (kernel), applications, as well as the domain manager, and other host system resources, which comprises the following steps:

operatively connecting a host memory integrity monitor to the monitored structure, calculating hash values of the monitored structure to detect changes made thereto, connecting the host memory integrity monitor to an administrative station via independent communication link, and sending reports to the administrative station from the host memory integrity monitor on the state of the monitored structures of the host via the independent communication link once changes to the host kernel have been detected.

The host memory integrity monitor is an independent monitor which does not rely on the health and correctness of the monitored structure. The monitor resides on a processor separated from the host's processor.

The host memory integrity monitor may be co-processor based and may be coupled to the host memory for monitoring the state and operation thereof through the PCI bus of the host system. The integrity monitor may also be co-processor based and reside on the motherboard of the host system.

Alternatively, the monitor may be based on a virtual co-processor, which is created by partitioning the processor into a host processor region and a monitor processor region by the domain manager, thereby operationally isolating the operation and functions of the monitor from the same of the host system.

Regardless of the particular hardware implementation of the monitor, the main principles of the present invention—operational independence of the monitor from the host system—provide for immunity of the monitoring system from the state of the host, even when the integrity of the host is seriously compromised. The hash values of the monitored structures are calculated by the host memory integrity monitor through direct memory access (DMA). During the monitoring of the structure to be examined, the host memory integrity monitor specifies the physical address of the critical structures to be retrieved for study. Prior to specifying the physical address, the host memory integrity monitor translates a virtual address of the monitored structure into a physical address thereof.

For the monitored kernel, the translation of the virtual address of the monitored structure into its physical address is based on a linear mapped addressing feature of the kernel for identifying the statically allocated data structures. However, if the monitored structures are dynamically allocated data structures, the host memory integrity monitor retrieves page tables maintained in the host kernel's virtual memory via direct memory access of the host kernel, and translates the virtual address into the physical address in accordance with the retrieved page tables.

The host memory integrity monitor calculates "known good" hashes of the monitored structures in their uncompromised state, and then recalculates the hashes of the critical structures throughout the host system runtime. Further, the "known good" hashes and the hashes calculated during the kernel runtime are compared, and in the case that the differences between the hashes are detected, the host memory integrity monitor sends a report to the administrative station on the state of the examined structure.

The recalculation of the hashes can be initiated periodically, for example, with a predetermined time period of approximately 30 seconds, or it may be activated at randomized time intervals.

At the administrative station, a manual or automatic analysis of the received report is conducted and judgment is formulated on whether the deviation between the "known good" hashes and the hashes calculated during the host system runtime represents a malicious modification to the monitored structure, or the deviation is due to a valid structure modification affected by the administrative system.

The host memory integrity monitor either identifies a foreign text added to previously empty monitored structures, or monitors the regions where a malicious instruction may be added to execute a foreign text.

The present invention is also directed to a host memory integrity monitoring system which comprises a host memory integrity monitor operating independently of the state of the monitored structure and which resides on a co-processor (physically or virtually), as well as an administrative system connected to the monitor through an independent communication link. The host memory monitor hashes monitored structures in the memory to detect changes made thereto, and sends reports on the state of the host kernel to the administrative station via the independent communication link existing therebetween. The monitored structures reside in the main memory and may include operating systems (kernel), applications, domain manager, etc.

The host memory integrity monitor may be arranged as a co-processor single board computer on a PCI add-in card attached to the peripheral component interconnect (PCI) bus of the host system. Additionally, the co-processor based monitor may be located on the host's motherboard. The monitor may also reside in a virtual co-processor. In this arrangement, domain manager, or other software capable of multiplexing the processor, partitions the processor into virtual regions: monitor's processor region, host's CPU region, and/or alternatively, domain manager processor region.

The host memory integrity monitoring system may include a plurality of the host stations with their respective monitors monitoring the host station, and a plurality of the administrative stations. In such a system, the host monitors may be connected in a peer-to-peer fashion each to the other to share the information about the state of each monitored host station and to make a collective decision on relevant actions needed once the modifications to the host stations have been detected.

In addition to the peer-to-peer architecture, a centralized communication and coordination infrastructure is contemplated which permits non-monitored stations to play a role in the configuration, correlation, and communication between and among monitors. In the infrastructure setting, one or more non-monitored systems communicates with monitors and other administrative stations to produce a more centralized policy and configuration control point. The centralized infrastructure can exist in a distributed manner to provide redundancy.

Administrative stations, may have direct interaction with the monitored hosts in addition to the direct interaction with the host memory/integrity monitor. Further, the system administrator may have an interactive control of the monitor through the administrative station.

These, and other features and advantages of the present invention, will be fully understood from the following description of the present invention accompanied by the Drawings.

DETAILED DESCRIPTION OF THE PREFERRED EMBODIMENT

Figure 1:
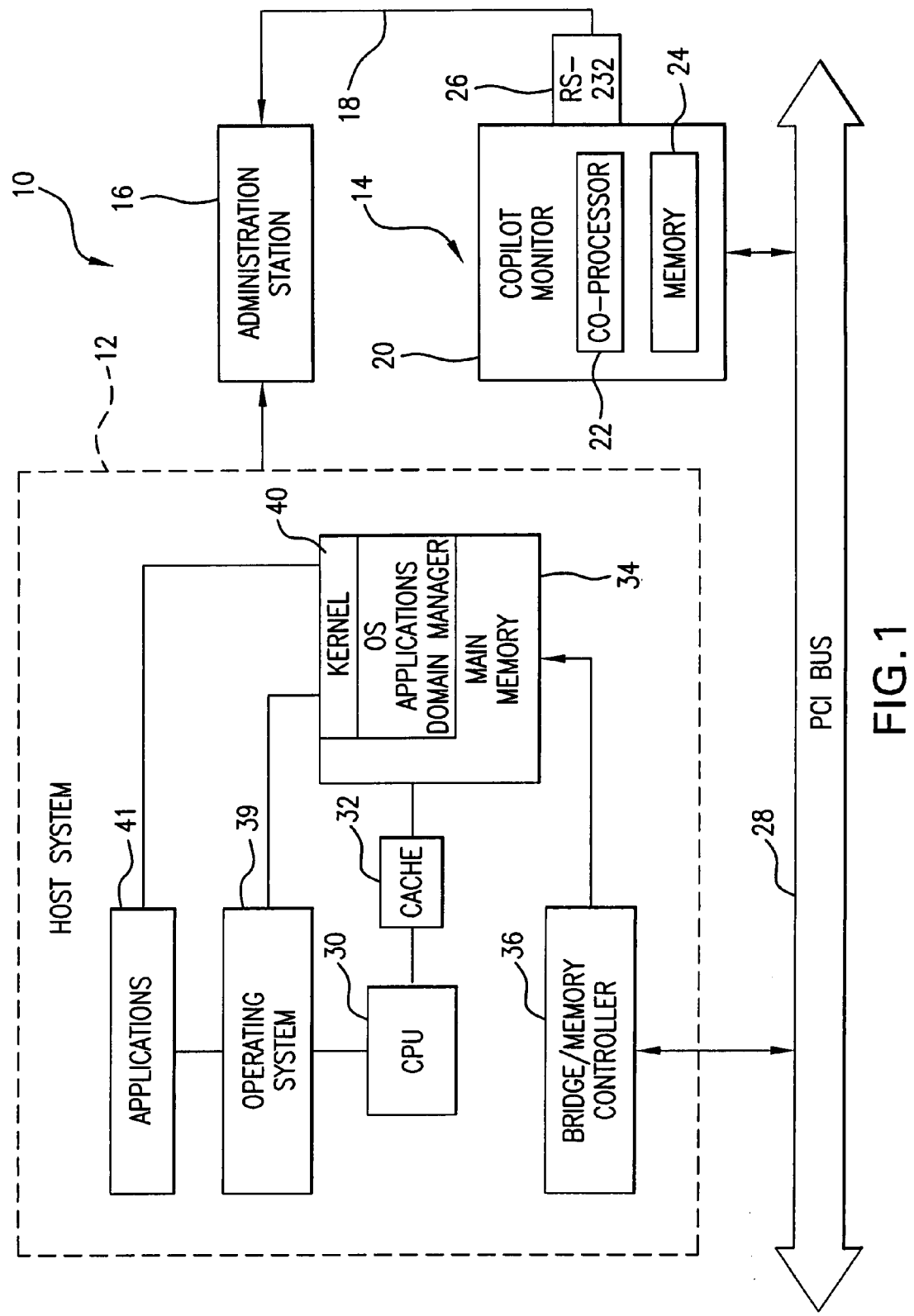
FIG. 1 is a schematic representation of the co-processor based host kernel monitoring system of the present invention arranged on the PCI bus add-on card.

The monitoring system 10 shown in FIG. 1, monitors the integrity of the host memory and host system's utilities in the memory, such as operating systems, applications, domain manager, etc. For examplary purposes and without limiting the scope of the novel concept of the present invention, the following description is made with the reference to monitoring the kernel of the host's operating system. However, it will be readily apparent to those skilled in the art that other host's systems utilities and resources, as well as bus devices, may be effectively monitored, as taught in the present patent application.

Referring now to FIG. 1, the host memory integrity monitoring system 10 includes a host system 12 to be monitored, a host memory integrity monitor 14, and an administrative system 16. The host system 12, is the mechanism that the monitor 14 of the present invention monitors for the presence of rootkits or other modifications. The host system 12 may be a desktop PC configured as a server. The administrative system 16 is the machine from which an administrator (managing entity) can interact with the monitor 14.

In one of the embodiments, the host kernel integrity monitor 14 can be implemented as an Intel Strong Arm EBSA-285 Evaluation Board which may be a Single Board Computer on a PCI Add-In Card Inserted into the Host's PCI Bus. The monitor retrieves a portion of the host RAM for examination through Direct Memory Access (DMA) without the knowledge of or intervention of the host kernel.

The administrative system 16 may be a laptop workstation that is connected to the monitor 14 via an independent communication link 18 attached to a connector on the back of the EDSA-285 Evaluation Board. The independent link 18 permits the monitor 14 to send reports to the administrative system 16 without relying upon the possibly compromised host 12 for communication. The link 18 also permits the administrative system 16 to periodically poll the monitor 14 in order to detect cases where the host 12 has been compromised and powered down, or trapped in a cycle of PCI resets that would prevent all of its PCI devices (including the monitor 14) from performing useful work.

For the example presented in the present Application, the host station 12, the monitor 14, and the administrative station 16, run versions of the GNU/Linux operating system, the configurations of which will be described further in following paragraphs.

The monitor 14 has the ability to perform arbitrary checks on system memory, and therefore has a mechanism to monitor for any number of indications that the kernel is no longer operating in a trustworthy manner. The monitor 14 of the present invention can perform its audit of system memory (kernel) every 30 seconds with less than 1% penalty to system performance. This efficiency, combined with the added assurance provided by the monitor architecture, results in a considerable advancement in the protection of commodity operating system's kernels running on commodity hardware. In addition to the detection possibilities of the monitor 14, its architecture provides for restoration (partial or complete) of changes due to malicious modifications and a more general scheme for configuration management.

In the particular example, presented herein, the monitor 14 is designed to monitor the 2.4 and 2.6 series of Linux kernels. The monitor aim is not to harden these kernels against compromise, but to detect cases where an attacker applies a rootkit to an already compromised host kernel. The monitor 14 is designed to be effective regardless of the reason for the initial compromise whether it is software, configuration flow, or human error in loading a stolen administrative password.

The monitor 14 depends upon a number of specific features of the IBM PC compatible PCI bus and the Linux virtual memory subsystem in order to operate. This feature and the manner in which the monitor 14 uses this feature to provide useful integrity monitoring functionality will be further described.

Although not limited in its functionality to the exemplary method which is only one of a plurality of examples, the monitor 14 presented herein implements a detection strategy based on MD5 or different versions of SHA (Standard Hash Algorithms). These hash calculations are known to those skilled in the art and therefore are not presented herein in detail. The monitor 14 hashes the host kernel's text, the text of any loaded LKMs (Loaded Kernel Modules), and the content of some of the host kernel's critical data structures. Like a number of the user-mode detection programs, it calculates "known good" hashes for these items when they are believed to be in a correct, non-compromised state. The monitor then periodically recalculates these hashes throughout host kernel runtime and watches for results that differ from the "known good" values. The monitor sends reports on hash values to the administrative systems 16 where they are analyzed to learn whether these hash values are indicative either of valid administrative kernel modifications (such as, for example, dynamic driver loading) or of a malicious rootkit. This judgment may be made either manually or automatically.

As shown in FIG. 1, the monitor 14 may be based on an add-in card 20 which includes its own processor (further referred to herein as the coprocessor 22), a monitor memory 24, and a serial RS-232 connection 26 for external logging and console access by the administrative station 16. The monitor 14 is attached to the host station 12 through the PCI bus 28 and provides the monitoring function with regard to the host station 12 through the PCI bus 28. The host station 12 includes a CPU 30, cache 32, main memory 34, and bridge/memory controller 36 through which the monitor communicates with the resources of the host station 12 by sending requests through the PCI bus 28.

The kernel 38 is a program that constitutes the central core of the computer operating system 39 and it has control over substantially everything that occurs in the host station 12. The kernel 38 itself does not interact directly with the user, but rather interacts with the shell in the operating system and other programs as well as with the hardware devices of the system including the processor 30, memory 34, and disk drives (not shown).

The kernel 38 is the first part of the operating system to load into the main memory (RAM) 34 during booting and remains in the memory for the duration of the computer session. Since the code that makes up the kernel is continuously needed, it is usually loaded into a protected area 40 of the memory 34. This prevents it from being overwritten by other, less frequently used parts of the operating system 39 or by application programs 41. The kernel performs its tasks in kernel space whereas everything a user normally does is done in user space.

The contents of a kernel vary considerably according to the operating system, but they typically include a scheduler, which determines how the various processes share the kernel's processing time, a supervisor, which grants use of the computer to each process when it is scheduled, and an interrupt handler, which handles all requests from various hardware devices that compete for the kernel's services, and a memory manager which allocates the system's address spaces among the users of the kernel's services.

In order to perform its task of monitoring host memory, the coprocessor 22 of the monitor 14, meets, at a minimum, the following set of requirements:

Unrestricted memory access. The coprocessor 22 must be able to access the system's main memory 34. Furthermore, it must be able to access the full range of physical memory since accessing only a subset is not sufficient.

Transparency. To the maximum degree possible, the coprocessor 22 should not be visible to the host processor 30. At a minimum, it should not disrupt the host's normal activities and should require no changes to the host's operating system or system software.

Independence. The coprocessor 22 should not rely on the host processor 30 for access to resources including main memory, logging, address translation, or any other task. The coprocessor 22 must continue to function regardless of the running state of the host machine 12.

Sufficient processing power. The coprocessor 22, at a minimum must be able to process large amounts of memory efficiently. Additionally, the choice of hashing as a means of integrity protection places on the coprocessor 22 the additional requirement of being able to perform and compare such hashes.

Sufficient memory resources. The coprocessor 22 must contain enough long-term storage to maintain a baseline of system state. This summary of a non-compromised host is fundamental to the proper functioning of the auditor. Furthermore, the coprocessor must have sufficient on-board, non-system RAM 24 that may be used for its own private calculations.

Out-of-band reporting. The coprocessor 22 must be able to securely report the state of the host system 12. To do so, there must be no reliance on a possibly-compromised host, even in the performance of basic disk or network operations. The coprocessor must also have its own secure channel 18 to the administrative station 16.

The EBSA-285 PCI add-in card 20 meets all of the above requirements and provides a strong foundation for implementation of the monitor 14 of the present invention.

The PCI bus 28 connects devices to a computer system in a manner so that they can communicate with each other and the host processor. As these devices are complex both in their design and performance, direct access to system memory without processor intervention is important. In order to separate memory access from the processor 30, a memory controller 36 is introduced to mediate between the processor 30 and the plurality of devices that request memory bandwidth via the bus. This process is commonly referred to as direct memory access (DMA) and is the foundation for many high-performance devices. The monitoring system of the present invention uses the principles of the DMA.

On any given PCI bus, there are two types of devices: initiators, or bus masters; and targets. Bus masters are responsible for initiating each transaction and targets serve as the receiving end of the information flow. A target is not given access to the bus without being explicitly queried by a bus master. Bus mastering is thus a requirement for a device to utilize DMA. Most modern PC motherboards can support multiple (typically five to seven) bus masters at any one time. Generally, networks, disks, and video controllers support both bus mastering and DMA. The EBSA-285 has full bus master functionality as well as support for DMA communication with host memory 34.

DMA was designed to increase system performance by reducing the amount of processor intervention necessary for device access to main memory. However, since the ultimate goal is to facilitate communication between the device and the processor, some information must be shared by both parties to determine where in memory, information is being stored. In order to account for the separation of address spaces between the bus 28 and main memory 34, the host processor 30 typically calculates the translation and notifies the device directly where access should be made in the PCI address space. Disadvantageously for the EBSA, and for the goal of monitoring the host memory 34, this separation makes it difficult to determine where in main memory the device is actually reading or writing. However, in the case of PC architecture, there is a simple one-to-one mapping between the two address spaces. Therefore, any access to PCI memory corresponds directly to an access in the 32-bit physical address space of the host processor. The result is full access to the host's physical memory without intervention or translation by the host processor.

Transparency and Independence

There are two main modes in which the monitor 14 of the present invention may be operated. In the first mode, the monitor loads its initial system image from the running host, while the second mode is a stand-alone mode that provides for complete independence with regard to process execution. As with all add-in cards, the EBSA is able to be queried by the host and reliant on the PCI bus for power in both modes of operation. However, in stand-alone mode, the EBSA may be configured to deny all configuration reads and writes from the host processor 30 thereby making its execution path immutable by an attacker on the host.

A creative attacker may find ways to disable the device such as sending a PCI-reset that will cause the board to reboot. However, two caveats to this attack are implemented in the system of the present invention. First, there is no easy interface for sending a PCI reset in most systems without rebooting the machine. Rebooting the host machine serves to bring unnecessary attention to the machine and may not be advantageous to the attacker, particularly since the boot time for the EBSA coprocessor is much faster than a standard Linux distribution. Second, in a proper configuration, the administrative station 16 is a completely separate machine from the monitor 14 and the host 12. A simple watchdog is placed on the administrative station 16 to insure that the monitor 14 reports as expected. If no report is provided after a configurable amount of time, an administrator may be notified.

Resources

The EBSA has sufficient resources to carryout the necessary operations on host memory 34. The process of reading and hashing continuously has been proven to perform in a reliable manner. In addition to its memory resources, the EBSA also provides a serial (RS-232) connection 26 for external logging and console access by the management station (administrative system) 16.

Figure 2:
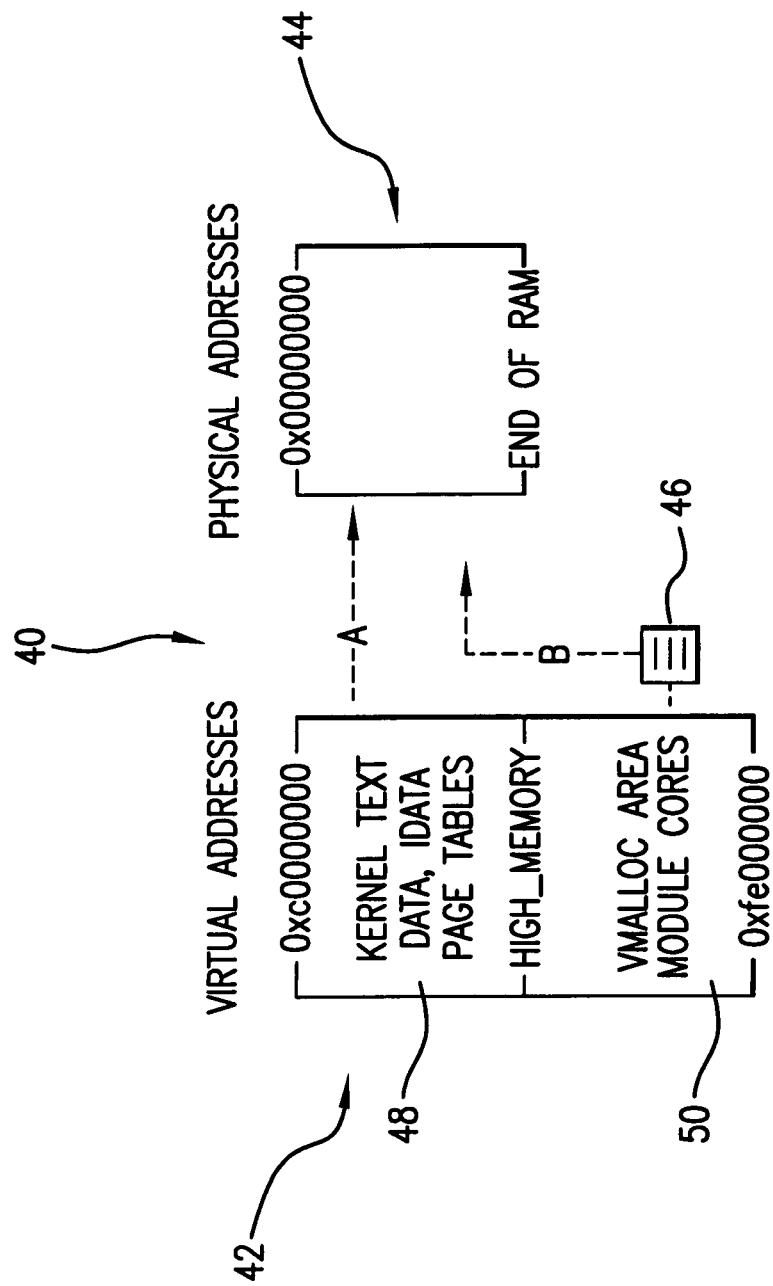
FIG. 2 is a schematic representation of a translation process of the virtual addresses into physical addresses of the important structures of the host kernel.

There are two features of the Linux kernel 38 that enable the monitor 14 to locate specific data structures and regions of text within the host kernel's address space: linear-mapped kernel virtual addresses and the absence of paging in kernel memory. The kernel's memory 40 is shown in FIGS. 1 and 2 and includes virtual subsystem 42 and physical memory subsystem 44.

The linear-mapped kernel virtual address feature enables the monitor 14 to locate the regions it must monitor within host kernel memory 40. When the monitor 14 wishes to examine a region of host kernel memory 40, it makes a DMA request for that region over the PCI bus 28. Due to the nature of the PCI bus 28 on the PC platform, the monitor 14 must specify the address of the retrieval region in terms of the host's physical address space 44. This requirement is somewhat inconvenient, since the monitor 14 takes the addresses of several symbols from the host kernel or its System.map file at the monitor 18 configuration time (these symbols are listed in Table 4). These addresses, as well as the pointers that monitor 14 finds in the retrieved regions themselves, are all represented in terms of the host kernel's virtual address space. Consequently, prior to making a DMA request on the PCI bus 28, the monitor 14 must first translate these host virtual addresses into host physical addresses.

The monitor 14 makes this translation by retrieving the page tables 46 maintained by the host kernel's virtual memory subsystem 42 via DMA and using them to translate addresses in the same manner as the host kernel. The nature of linear-mapped virtual addresses in the Linux kernel enables the monitor 14 to overcome the problem of how to retrieve the host kernel's page tables 46 when those same page tables are seemingly required to initiate DMA. This solution is described more fully below.

TABLE 4

| symbol | use |
| --- | --- |
| __text | beginning of kernel text |
| __etext | end of kernel text |
| sys_call_table | kernel's system call table |
| swapper_pg_dir | kernel's Page Global Directory |
| modules | head of kernel's LKM list |

FIG. 2 contains a diagram showing two of the three kinds of virtual addresses used by the host kernel and their relationship to physical addresses. On the 32-bit i386 platform, the Linux kernel reserves virtual addresses above 0xc0000000 for kernel text and data structures. Virtual addresses between 0xc0000000 and the point marked "high memory" in FIG. 2 are called linear-mapped addresses 48. There are as many linear-mapped addresses as there are physical addresses on the host. The point where "high memory" lies may be different from host to host, depending on the amount of RAM each host incorporates. These addresses are called linear-mapped addresses since the Linux kernel maps them to physical addresses in a linear fashion wherein: the physical address may be found by subtracting the constant 0xc0000000 from the corresponding linear-mapped address. This linear mapping is represented by the arrow A in FIG. 2.

All of the Linux kernel's page tables 46 reside in the linear-mapped region 48 of virtual memory 42. Consequently, monitor 14 may take the virtual address of the topmost node in the tree-like page table data structure from System.map and subtract 0xc0000000 to determine its physical address. It may then use this physical address to retrieve the topmost node via DMA. The pointers that form the links between the nodes of the page table tree are also linear-mapped addresses so the monitor 14 may retrieve secondary nodes in the same manner as it did the first node.

This simple linear-mapped address translation method is sufficient to retrieve the host kernel text, its page tables, and those data structures statically-allocated in its initialized and uninitialized data segments ("data" and "idata" in the diagram). However, it is not sufficient for retrieval of dynamically-allocated data structures such as the buffers containing LKM text.

These dynamically-allocated data structures reside in the region 50 of host virtual memory 42 running from the "high memory point" to 0xfe000000000. The kernel does not map these virtual addresses to physical address as in a linear manner. Instead, it uses its page tables 46 to maintain a non-linear mapping, represented by the arrow B in the diagram shown in FIG. 2. In order to translate these virtual addresses to physical addresses suitable for DMA, the monitor 14 evaluates the host kernel's page tables and performs the translation calculation in the same way as the host kernel.

The host Linux kernel 38 in the monitor 14 organizes its memory in pages that are 4 kilobytes in size. Due to the linear nature of the address mapping between 0xc0000000 and "high memory", the monitor is guaranteed to find large data structures that span multiple pages in this region of virtual memory stored in an equal number of contiguous page frames in physical memory. Due to this contiguous storage, monitor 14 retrieves them with a single DMA transfer.

However, a single DMA transfer may not be sufficient for large data structures spanning multiple pages in the non-linear-mapped region 50 of the virtual memory 42. In this region, the host kernel's page tables 46 may map pages that are contiguous in virtual memory onto page frames that are not contiguous in physical memory. Because of this potential for separation, the monitor 14 must perform separate address translations and DMA transfers for each page when examining large data structures in this region.

The Linus kernel's page tables 46 cover only the portion of the virtual address space reserved for the kernel whose contents do not depend on which processes are currently running. There is a third kind of kernel virtual address not shown in FIG. 2 which are the fix-mapped addresses residing above 0xfe000000 in the kernel virtual address space.

The monitor 14 also relies on the absence of paging in kernel memory 40. Although the Linux kernel will sometimes remove pages of virtual memory belonging to a user process from physical RAM in order to relieve memory congestion, it never removes pages of kernel memory from physical RAM. Consequently, regardless of which user processes are running or otherwise occupy physical RAM at any point in time when monitor 14 makes a DMA transfer, the kernel and its data structures are always be present in their entirety.

Kernel Integrity Monitoring Strategy

The monitor detects changes in critical regions of the host kernel memory by hashing them. The monitor looks for changes in general, rather than symptoms specific to a particular set of well-known rootkits, and thus can detect modifications made by new rootkits. The monitor 14 hashes two classes of host kernel memory: (1) memory containing kernel or LKM text and (2) memory containing jump tables of kernel function pointers.

The reason for the first class is easily explained wherein by hashing all of the host's kernel and LKM text, the monitor can detect cases where a rootkit has modified some of the kernel's existing executable instructions.

The reason for the second class is more complex. Optimally, the Copilot monitor 14 would be able to identify foreign text added into previously empty regions of host kernel memory by a rootkit, either via the kernel's standard LKM-loading interface or via its /dev/mem or /dev/kmem interfaces. Unfortunately, distinguishing between buffers of foreign text and buffers of harmless non-executable data is not an easy task on PC-compatible systems such as the host 12. The i-386-family of CPUs do not provide a distinct "execute" permission bit for memory segments containing executable text where only a "read" bit is used for both text and non-executable data.

Because of this difficulty, rather than attempting to identify the foreign text itself, the monitor 14 places where a rootkit might add a jump instruction or a function pointer that would cause the existing host kernel to execute the foreign text. According to the logic of this workaround solution, foreign text added to empty kernel memory is harmless provided that it cannot be executed.

The monitor's hashing strategy covers some of these cases (a) by detecting places where a rootkit modifies existing host kernel or LKM text to jump to some foreign text; and (b) by observing all of the host kernel's jump tables for additions and changes.

The Linux kernel has a plurality of jump tables. Some, such as the system call table, are not meant to change during the kernel's runtime. Others, such as the virtual filesystem layer's file operation vectors, are designed to be amended and revised whenever an administrator loads or unloads a filesystem driver. Every LKM can potentially add more jump tables.

The kernel jump table hashed by the present monitor 14 as the test, is the host kernel's system call vector. Testing has demonstrated that host kernel integrity monitoring is possible from the coprocessor 22 on a PCI add-in card 20.

Empirical results regarding the performance penalty of the monitoring system of the present invention have been shown experimentally to provide attackers with only a 30-second window while reducing system performance by less than 1%.

It is well-known that memory bandwidth creates a bottleneck for CPU efficiency. While the addition of DMA to systems has increased performance by reducing the number of processor interrupts and context switches, it has also increased contention for main memory by allowing multiple devices to make requests concurrently with the processor. In the case of low-bandwidth devices, such as a simple network interface card (NIC), this additional memory contention has not proven to be significant. However, it has been shown that the advent of high-performance network and multimedia equipment has begun to test the limits of the penalty allowable for memory access.

Because of the nature of the monitor, e.g., reading large amounts of memory periodically using the PCI bus, some negative effect on system performance may be anticipated. The degradation is generally based on two primary factors. These are (1) contention for main memory and (2) contention for the PCI bus. The penalties have been measured empirically through a set of benchmarks, the STREAM microbenchmark and the WebStone http server test suite. It has been found that while there is clearly a temporary penalty for each run of the monitor, the infrequency with which the system must be checked results in sufficient amortization of that penalty.

The STREAM benchmark has been developed to measure sustainable memory bandwidth for high-performance computers. While intended for these high-end machines and memory models, STREAM has proven to be an effective measure of PC memory bandwidth, at least for comparison purposes. The benchmark has four kernels of computation, each of which is a vector operation on a vector much larger than the largest CPU-local cache. The four kernels can be summarized as a simple copy operation, scalar multiplication, vector addition, as well as a combination of the latter two.

To test the impact of the monitor on host memory bandwidth, a standard posttest-only control group design has been utilized. The experiment was run by bringing the system to a known, minimal state and running the STREAM benchmark. For the purposes of the STREAM tests, minimal is defined as only those processes required for system operation including a console shell. There were no network services running, nor cron, syslog, sysklogd, or any other unnecessary service. STREAM was first run 1000 times without the monitor running to obtain an average for each of the four kernels as control values. Similarly, STREAM was run 1000 times with the monitor hashing in a constant while-loop. The monitor would therefore continuously read a configuration file for memory parameters, read system memory, make a hash of the fields it had read, compare that hash with a known value in a configuration file, report to the console as to the status of the hash, and continue with another memory region.

The results of the experiment, summarized in Table 5 (Summary of STREAM benchmark for 1000 runs with and without the monitor running) were verified using a standard t-test to be statistically significant (p<0.001). Table 5 shows the computed mean, variance, and standard error for each group, separated by STREAM kernel. The fourth column, Penalty, is the percent difference of the average bandwidth with the monitor running and the average bandwidth without the monitor running.

There are a few characteristics of the data worth noting. First, the greatest penalty experienced in this microbenchmark was just under 10%. This is considered a reasonable penalty given that the test environment had the board running in a continuous loop which is a worst-case and an unlikely scenario in a production environment. Second, it should be noted that the variance is significantly higher for the "monitor on" case for all four tests. This can be explained by the asynchronous nature of the two systems. Sometimes, for example when the monitor is working on a hash and compare computation, the host processor will immediately be given access to main memory. At other times the host processor will stall waiting for the board to complete its memory read.

TABLE 5

| Monitor Status | Average (MB/s) | Variance | Standard Error | Penalty |
|---|---|---|---|---|
| COPY | | | | |
| Off | 921.997001 | 20.896711 | 0.144557 | 0.00% |
| On | 833.016002 | 107.949328 | 0.328556 | 9.65% |
| SCALE | | | | |
| Off | 920.444405 | 14.417142 | 0.120071 | 0.00% |
| On | 829.142617 | 100.809974 | 0.317506 | 9.92% |
| ADD | | | | |
| Off | 1084.524918 | 47.928264 | 0.218925 | 0.00% |
| On | 1009.868195 | 86.353452 | 0.293860 | 6.88% |
| TRIAD | | | | |
| Off | 1084.098722 | 42.922323 | 0.223433 | 0.00% |
| On | 1009.453278 | 82.296079 | 0.286873 | 6.89% |

The second benchmark utilized was the WebStone client-server benchmark for http servers. Similar to the above, a standard "monitor on" or "monitor off" approach was taken to compare the impact of the prototype on system performance when the system is being used for a common task which in this case was running as an Apache 1.3 29 dedicated web server. Additionally, a third test scenario was run whereby the monitor was running, but at more realistic intervals. For the purposes of the experiment, the intervals of five, fifteen, and thirty seconds were chosen which are numbers believed to be at the lower (more frequent) extreme for a production system.

As with the STREAM benchmark, care has been taken to bring the system to a minimal and consistent state before each trial. While the cron daemon remained off, syslog, sysklogd, and Apache were running for the macrobenchmark tests. The experiment was conducted using a Pentium III laptop connected to the server via a Category 5e crossover cable. The laptop simulated 90-client continuous accesses using the standard WebStone fileset and was also brought to a minimal state with regards to system load before the test. The trial duration was 30 minutes and each trial was performed four times.

Table 6 (Summary of Webstone Throughput results for 90 clients) shows the "continuously running" tests where each resulted in significantly less throughput (shown in Mb/s) for the Apache web server than the other four cases. Table 6 presents averages for the four trials of each monitor status (continuous, off, running at intervals). As is seen from the data, running the monitor continuously results in a 13.53% performance penalty on average with respect to throughput. By spacing monitor checks at intervals of at least 30 seconds the penalty was reduced to less than 1%. As expected, the more frequently the monitor runs, the more impact there is on system performance.

The data supports the assumption that memory contention and PCI contention are the primary threats to performance. Because the Web server utilizes a PCI add-in card NIC, it is likely that the system was significantly impacted by PCI scheduling conflicts between the EBSA and NIC card as well as memory contention between the EBSA/NIC (whichever got control of the PCI) and the host processor. The NIC driver utilizes DMA and thus also competes with the processor for memory cycles.

TABLE 6

| Monitor Status | Average (MB/s) | Variance | Standard Error | Penalty |
|---|---|---|---|---|
| Off | 88.842500 | 0.000158 | 0.006292 | 0.00% |
| 30-second Intervals | 88.097500 | 0.000892 | 0.014930 | 0.84% |
| 15-second Intervals | 87.427500 | 0.000158 | 0.006292 | 1.59% |
| 5-second Intervals | 85.467500 | 0.000158 | 0.006292 | 3.80% |
| Continuous | 76.830000 | 0.002333 | 0.024152 | 13.52% |

The second, and more important conclusion that arises from the WebStone data is that the penalty for running the system periodically is far less than that of running it continuously. Furthermore, since the monitor is meant to combat attackers who typically exploit vulnerabilities and then return days or weeks later to the system, the chosen interval of 30 seconds is an extremely conservative estimate for production systems. In addition, because of the configurability of the prototype solution, system administrators who are experiencing unacceptable performance losses can increase the interval to calculate the hash value at randomized intervals.

Version 2.4 and 2.6 Linux kernels provide many jump tables where LKMs can register new functionality for such things as virtual filesystems or mandatory access control. When the monitor 14 monitors the integrity of such jump tables, reports any additions or changes it sees to the admin station regardless of whether they were caused by a rootkit or by valid administrative action (such as loading a filesystem or security module).

In the monitor, a human administrator is responsible for distinguishing between these two possible causes whenever a report arrives. For example, administrators might disregard a report of changes to the host kernel's security module operation vectors if they themselves have just loaded a new security module on the host. The level of automation on the admin station may be attained by implementing a policy enforcement engine that will permit reports of certain modifications to pass (possibly based on a list of acceptable LKMs and the data structures they modify), but act upon others as rootkit activity. Additionally, it is contemplated that the administrative station 16 may enable centralized and decentralized remote management of multiple networked monitors 14.

Based on the same DMA principles that give the monitor 14 access to read system memory 34 it is possible to provide replacement of corrupted text through the same mechanism. The monitor 14 in conjunction with the admin station 16 is capable of kernel healing, particularly as it relates to the automated administration. The ability to replace certain portions of a corrupted host system, such as, for example, certain jump tables (system call vector) as well as the kernel text, provides a high level of security for the monitored system 12.

The present monitor 14 generates its "known good" hashes by examining the contents of host kernel memory 40 while the host kernel 38 is assumed to be in a non-compromised state. This practice admits the possibility of mistaking an already-compromised kernel for a correct one at the monitor initialization time, causing the monitor to assume the compromised kernel is correct and never report the presence of the rootkit. This concern is particularly relevant in the case of LKMs, which the monitor hashes only after the host kernel loads them late in its runtime.

Figure 11:
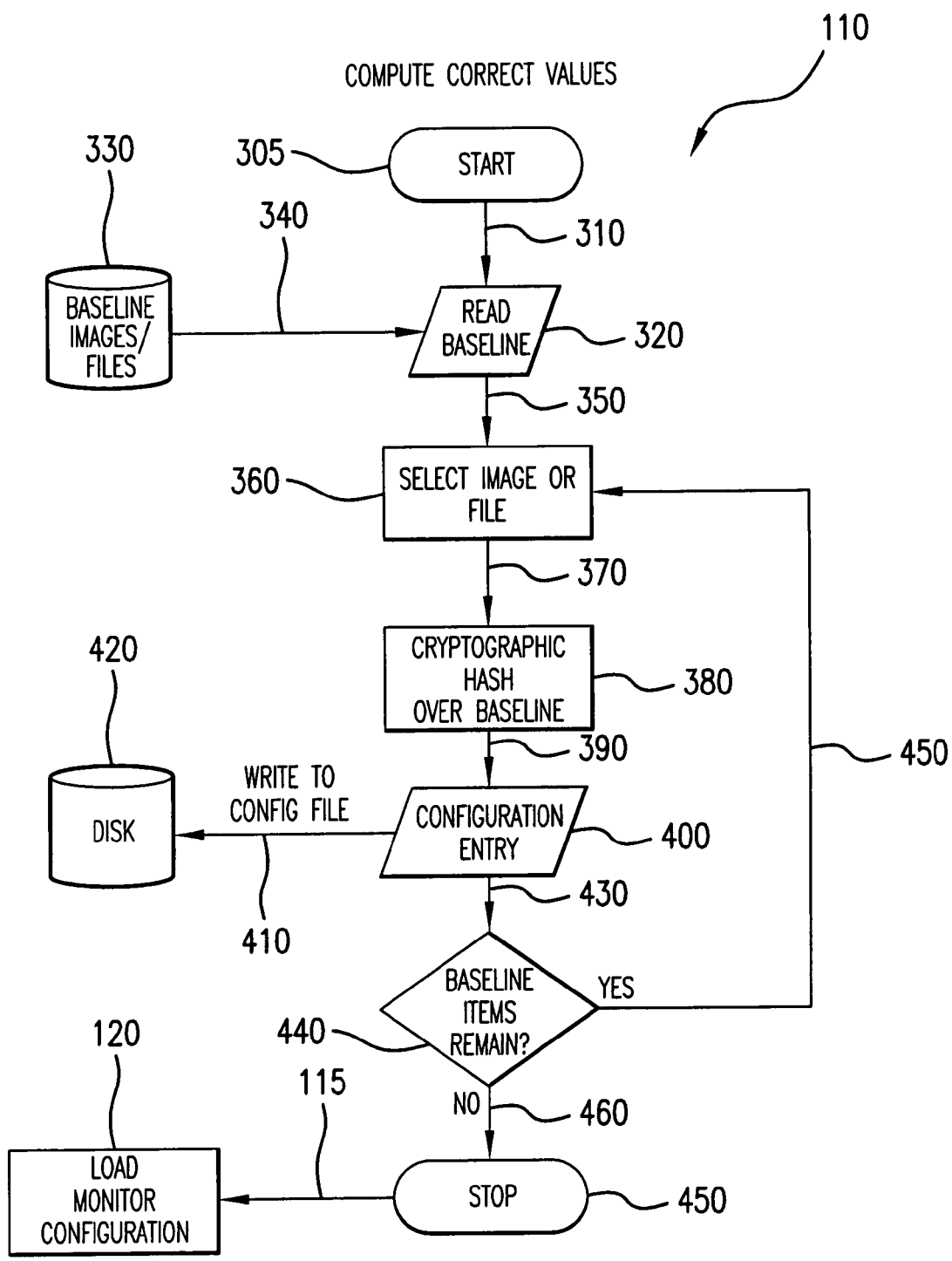
FIG. 11 is a flow-chart diagram of the "Compute Correct Values" sub-routine of the monitoring method of the present invention.

This limitation is addressed in the present monitoring scheme by enabling the monitor 14 to generate its "known good" hashes from the host's trustworthy read-only installation media as will be presented in the description related to FIG. 11. The image of the host kernel's text stored on the installation media (and on the host's filesystem) may not precisely match the image that resides in host memory after host bootstrap. For example, the Linus 2.6 VM subsystem's Page Global Directory admits the kernel text. This data structure is initialized by the host kernel's bootstrap procedure and subsequently may not match the image on the installation media. Nonetheless, it may be possible to predict the full contents of the in-memory image of the host kernel from its installation media, possibly by simulating the effects of the bootstrap procedure.

The Linux kernel has many jump tables. Any of these jump tables may become the target of a rootkit seeking to register a pointer to one of its own functions for execution by the kernel. Every LKM can potentially add more jump tables. The present monitor, monitors the integrity of the jump tables in an attempt to cover the jump tables of some particular configuration of the Linux kernel using a specific set of LKMs.

The monitor 14 of the present invention is designed to run its checks periodically which may be every 30 seconds by default as now exists in the prototype. A rootkit might conceivably modify and rapidly repair the host kernel between checks as a means of avoiding detection, although this lack of persistent changes would seem to decrease the utility of the rootkit to the attacker. In order to prevent such evasion tactics from working reliably, the monitor has an added capability to randomize the intervals between its checks, making their occurrences difficult to predict.

Investigations into secure bootstrap have demonstrated the use of chained integrity checks for verifying the validity of the host kernel. These checks use hashes to verify the integrity of the host kernel and its bootstrap loader at strategic points during the host's bootstrap procedure. At the end of the bootstrap procedure, the checks provide evidence that the host kernel has booted into a desirable state. The monitor 14 operates after host kernel bootstrap is complete and provides evidence that the host kernel remains in a desirable state during its runtime.

There are many software packages intended to detect the presence of kernel-modifying rootkits, including St. Michael and St. Jude. However, these software packages are intended to run on the host that they are monitoring and will operate correctly only in cases where a rootkit has not modified the behavior of the kernel's /dev/mem and /dev/kmem interfaces to hide its own presence. Due to the fact it runs on a coprocessor on a separate PCI add-in card, the monitor 14 does not share a dangerous dependence on the correctness of the host kernel and can be expected to operate correctly even in cases where a rootkit has arbitrarily modified the host kernel.

The present invention demonstrates the advantages of implementing a kernel integrity monitor on a separate PCI add-in card over traditional rootkit detection programs that run on the potentially infected host. Because the present monitor software runs entirely on its own PCI add-in card, it does not rely on the correctness of the host that it is monitoring and is resistant to tampering from the host. Consequently, the monitor 14 can be expected to correctly detect malicious kernel modifications, even on hosts with kernels too thoroughly compromised to allow the correct execution of traditional integrity monitoring software. The monitor 14 does not require any modifications to the host's software and can therefore be easily applied to commodity systems.

Monitor Interaction with the Monitored Host

As a member of the local bus, the monitor 14 has access to read and write to/from system memory and many other system devices (e.g. hard disks, network controllers, bridges). The functionality that the monitor will provide with respect to its direct interaction with the monitored host is presented infra herein.

Detection

The detection capabilities of the monitor include the following:

Changes to static kernel memory: The text or other portions of memory that remain resident throughout the operation of a running kernel is monitored using secure hashing or direct comparison to ensure they have not been modified.

Changes to semi-static kernel data: Many kernel data structures change infrequently. These include, but are not limited to, data structures of or relating to kernel modules, attached devices, listening sockets, firewall rules, and mounted filesystems.

Anomalies in dynamic kernel data: Such anomalies include, but are not limited to, unauthorized processes running with higher privileges (privilege escalation), network connections, logged-in users, paged kernel memory, open files, and process execution time.

Interaction with bus devices: There are a number of devices which may be monitored based on direct access to the bus. While not all possible devices can be listed, the monitor will have device-specific functionality to monitor certain aspects of each device connected to the bus. This includes, but is not limited to, disk integrity monitoring, network connection monitoring, proper device configuration, and direct bus traffic analysis.

Direct Correction

As a bus mastering device, full access to the bus provides the ability to manipulate running kernel memory and actively functioning bus devices. The monitor provides functionality regarding the following:

Kernel text replacement: Restoring unexpected modifications to static kernel such as function text, the system call table, and other static jump tables.

Kernel data structures: In response to certain anomalies such as unexpected privilege escalation, the monitor attempts to mitigate the effects by changing certain aspects of kernel data which include, but are not limited to, process state, effective processes user identity, file descriptors, network connections, filesystems, and device-specific parameters.

Device-specific changes: Similar to the above note on detection, devices such as disks may require direct changes in an attempt to fix anomalies or violations of security or configuration policies. The monitor uses the local bus to directly access and manipulate these devices.

Indirect Correction

Through the admin station or other feedback mechanism the changes detected by the monitor can be used to ask the host operating system or other devices to make self-changes which include, but are not limited to, updating system software, applying patches, changing the configuration of services, controlling processes, bringing down network connections, deleting files, and rebooting/shutting down.

In addition to the co-processor based embodiment of the monitoring system shown in FIG. 1, the principles of the present invention are also applicable to other alternative embodiments of the subject novel monitoring system, shown in FIGS. 3-6.

Figure 3:
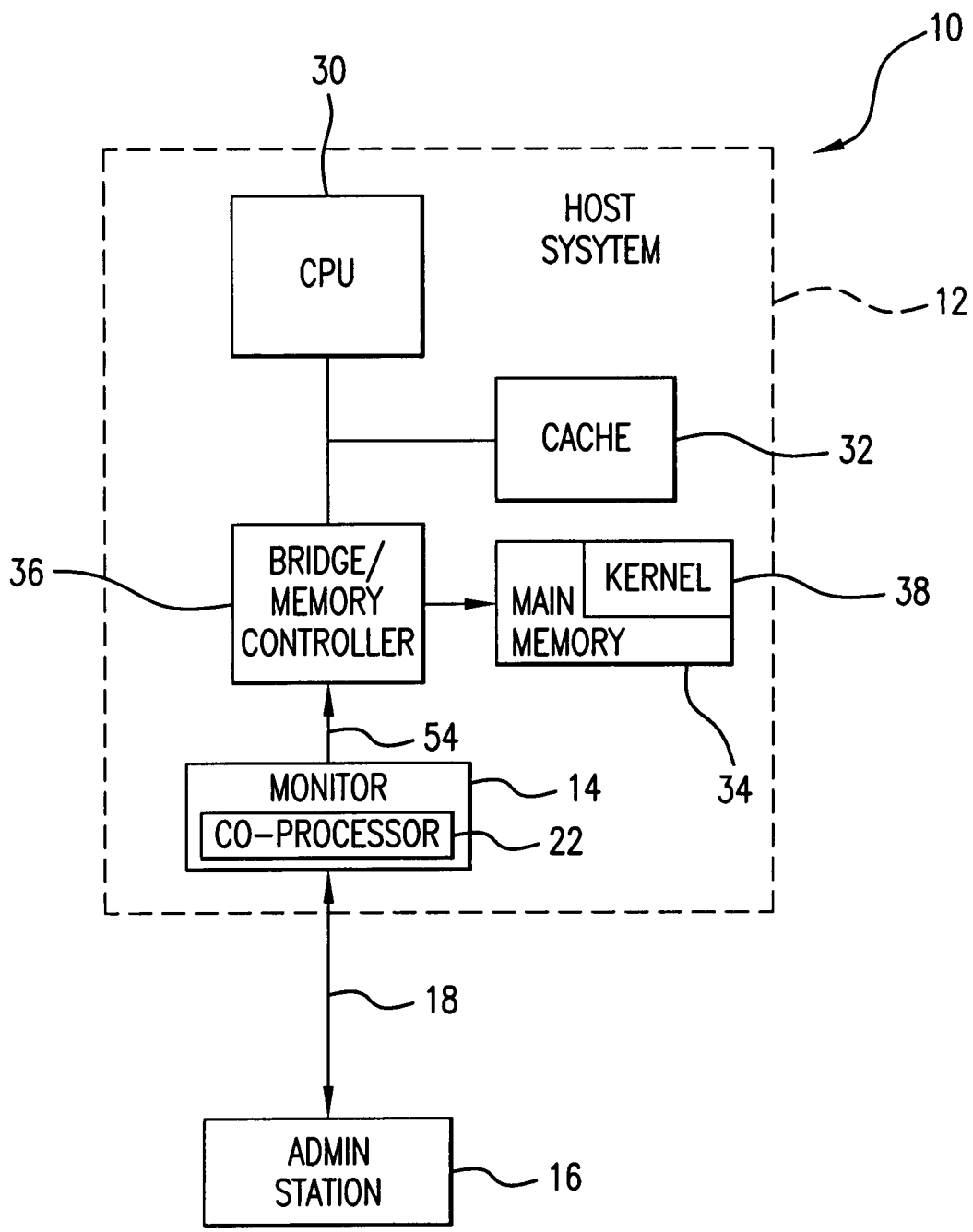
FIG. 3 is a schematic representation of the co-processor based monitoring system of the present invention arranged on the host's motherboard.
Figure 3A:
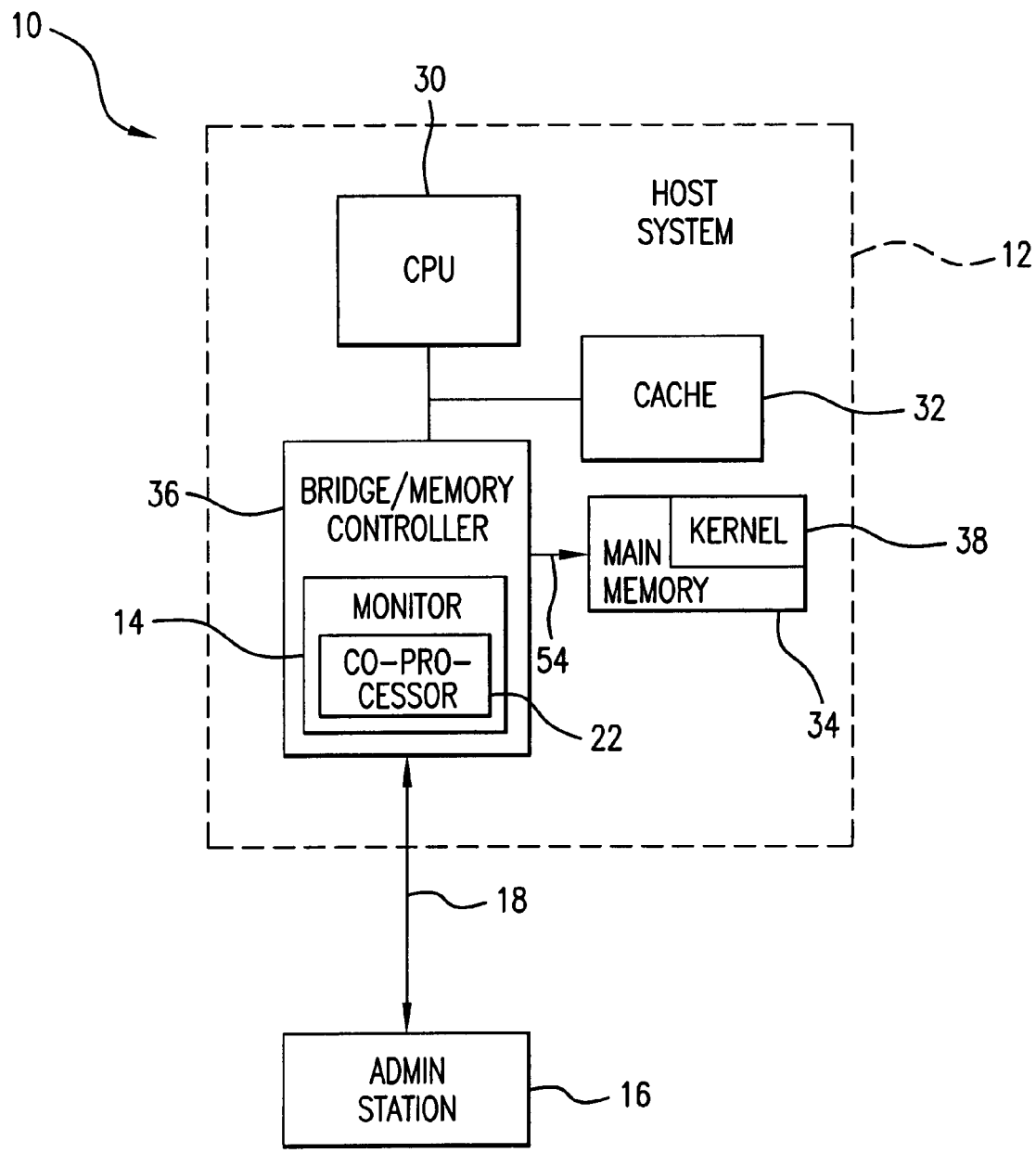
FIG. 3A is a schematic representation of the co-processor based monitor of the present invention residing in the bridge/memory controller of the host system.

As shown in FIGS. 3 and 3A, the co-processor based monitor 14 resides on the motherboard of the test system 12, either as a part of a larger chip or as a separate chip (e.g., I/O chip). As shown in FIG. 3, the monitor 14 is coupled to the monitored structure, for example, the kernel 38 in the main memory 34 through a local bus 54 and the bridge/memory controller 36. The monitor 14 operates independently of the host's CPU 30 and does not rely upon the state of the kernel.

In the embodiment presented in FIG. 3A, the co-processor based monitor 14 resides in the bridge/memory controller 36. Similar to the embodiment shown in FIG. 3, the monitor 14 is coupled to monitored structure, for instance, the kernel 38, through the bridge/memory controller 36 and the local bus 54 and operated independently of the host system.

Figure 4:
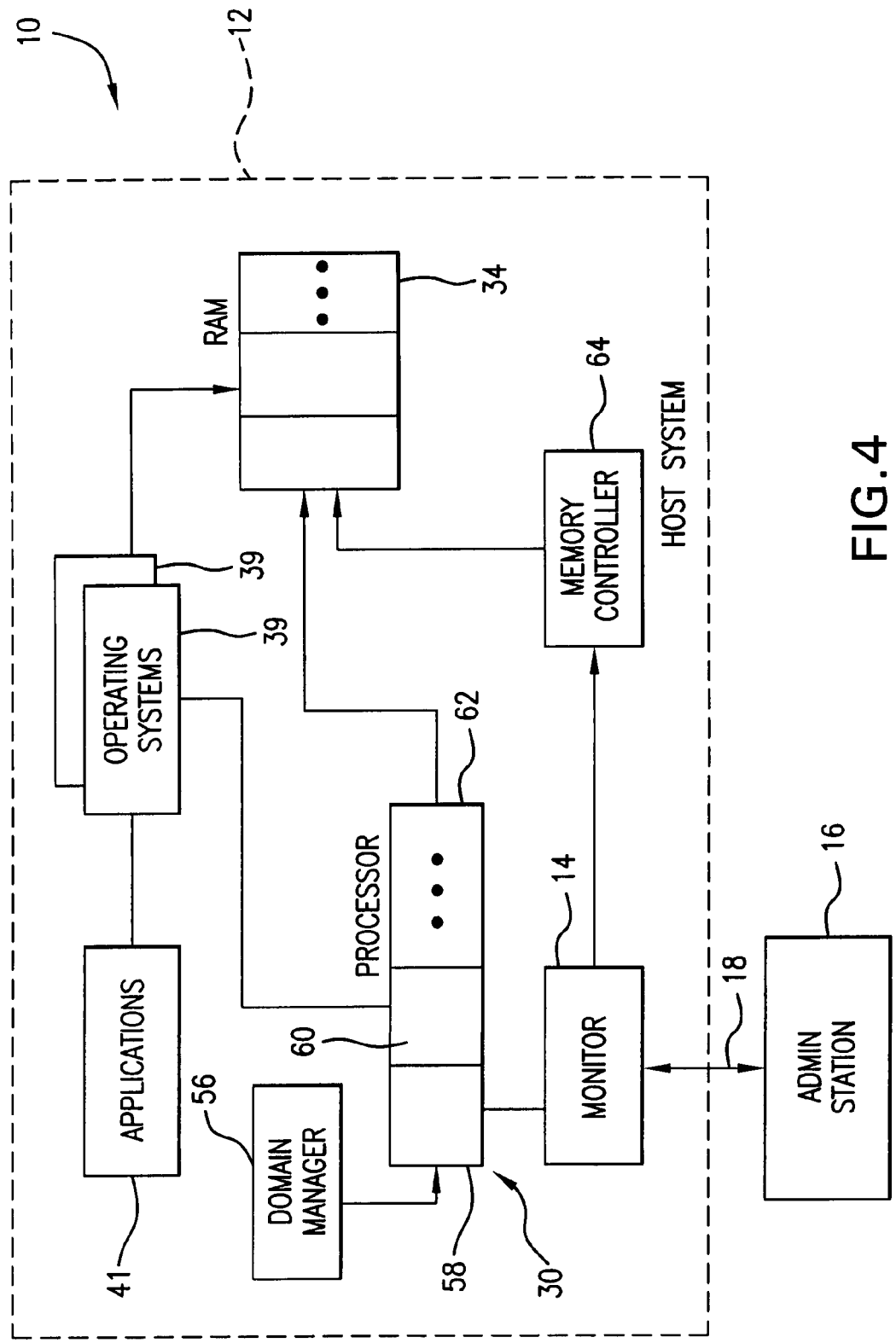
FIG. 4 is a schematic representation of the monitoring system of the present invention based on a virtual co-processor.
Figure 5:
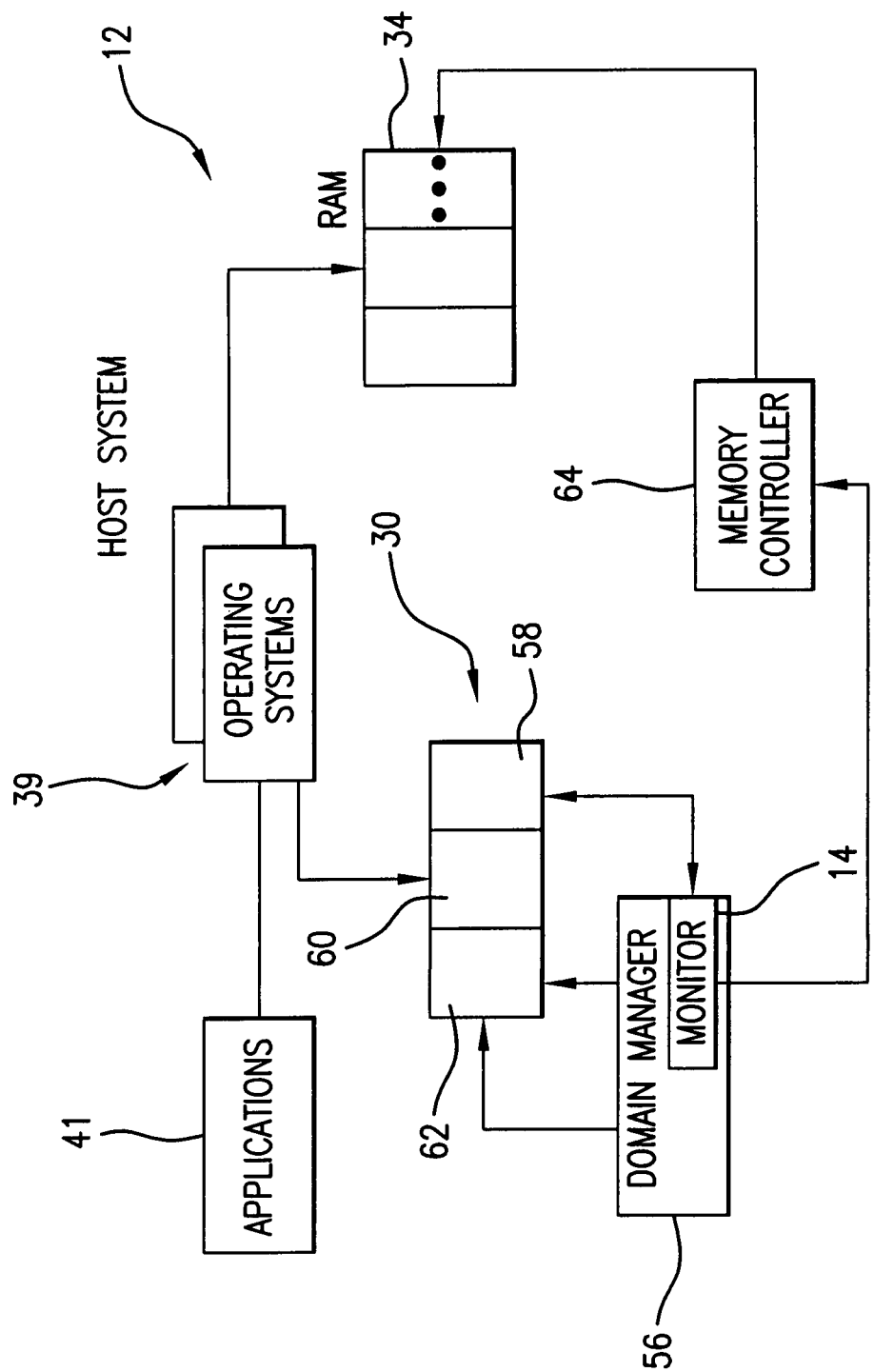
FIG. 5 is a schematic representation of the monitoring system of the present invention based on the virtual co-processor, where the monitor resides in the domain manager.

Referring further to FIGS. 4 and 5, which present different alternative embodiments of the monitoring system 10 of the present invention which use the principles of independent operation of the monitor 14 from the host system 12, software 56, also called Domain Manager, is responsible for multiplexing the processor 30. The processor 30 is partitioned into the separate and isolated processor regions 58, 60 . . . 62, so that the processor 30 appears as multiple co-processors 58, 60, . . . 62, further referred to herein as virtual co-processors.

In the embodiment presented in FIG. 4, the monitor 14 resides on the virtual co-processor 58. The monitored structure, for example, the operating system 39 may reside on the virtual co-processor 60. In this manner, the principles of independent operation of the monitor 14 from the host system 12 is employed, similar to the employment of the embodiments shown in FIGS. 1 and 3, which use physical co-processor based monitoring. Advances in solid-state technology, as well as the use of memory controller 62 for allocating the respective areas of the memory 34 for examination, allows the same degree of isolation between the virtual co-processors (FIGS. 4, 5) as is provided with the physical co-processors (FIGS. 1,3).

As shown in FIG. 5, the monitor 14 may also reside within the Domain Manager 56. In this embodiment, even though the Domain Manager is software responsible for multiplexing of the CPU 30, it provides the virtual co-processor (region) 62 for itself as well.

It will be readily apparent to those skilled in the art, that although the monitored structures, such as operating system 39, applications 41, Domain Manager 56, are shown outside the main memory 34, these monitored structures are loaded in the memory and are examined in the memory monitoring process of the present invention.

Inductive Extension of the Monitor

Figure 6:
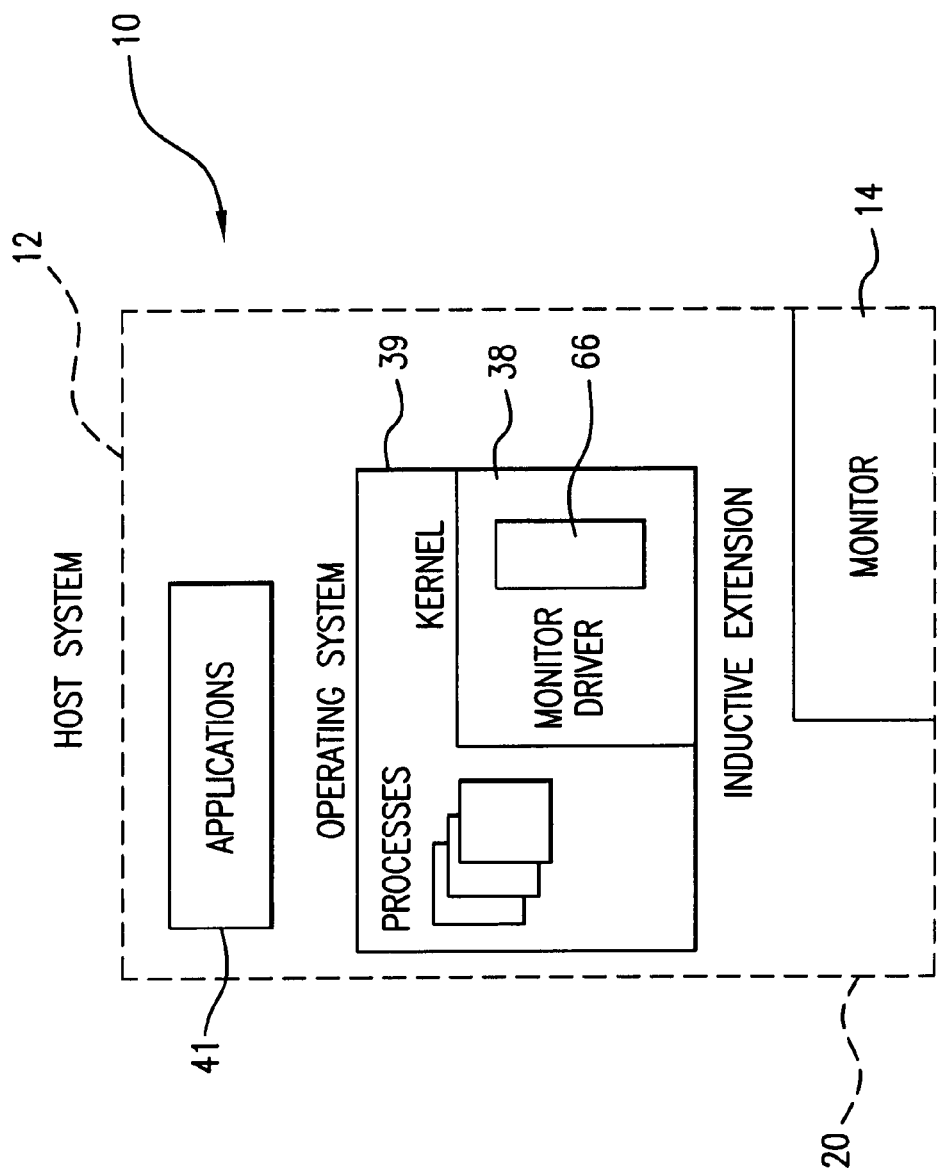
FIG. 6 is a schematic representation of the inductive extension of the host kernel integrity monitor of the present invention into the operating system.

The assurance provided by the monitor 14 can be extended into an operating system through the addition of a driver 66, as shown in FIG. 6. In this embodiment, the PCI board 20 monitors the integrity of the kernel text and the driver 66. The driver is then capable of monitoring the paged portions of the operating system 39 as well as applications 41. Furthermore, the driver has easy access to the kernel's data space. As a result, examples of the capabilities available in the embodiment of FIG. 6 without loss of security are:

1. Monitor the process table for events such as privilege escalation.

2. Ensure that the OS (operating system) is in fact operating and not a diversion, or shell.

3. Leverage protection into virtual machines running on the OS.

4. Access the file system of the OS without concern for potential race conditions.

5. Operate as a reference monitor.

6. Provide secure storage.

7. Kill and execute processes.

8. Repair running processes.

Monitor Interaction with Other Monitors

The monitor architecture works for both a single, standalone machine or within the context of a many-system environment. Such systems may, or may not, be directly connected via a network. In the multi-system case, the monitor architecture provides for direct (peer-to-peer) or centralized communication and coordination depending on the specifics of the environment.

Figure 7:
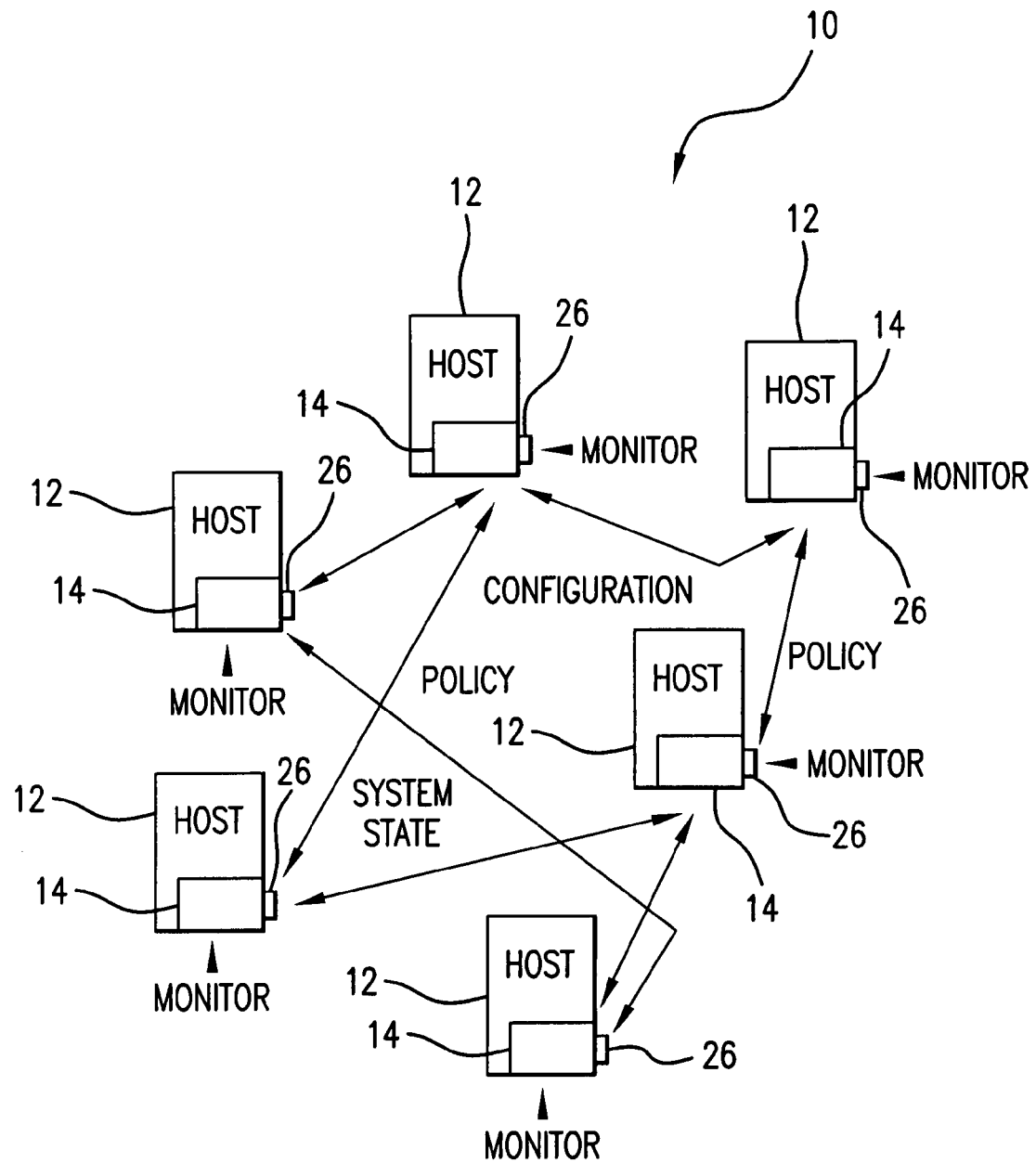
FIG. 7 illustrates schematically the peer-to-peer architecture of the monitoring system of the present invention.

As shown in FIG. 7, monitors 14 can be connected via network, serial, or other direct links to organize themselves in the peer-to-peer scheme to communicate in an ad-hoc fashion. Once organized, these devices share information regarding the state of each monitored system and make collective decisions on how to improve or maintain the current security and configuration of the system. The ad-hoc nature of the system allows for any number of monitors to be added or removed from the system with or without prior notice. Through this architecture, monitors can provide correlation, redundancy, failure detection, cooperative configuration, and organized response.

Similar to the peer-to-peer architecture in functionality, the infrastructure architecture permits non-monitor stations to play a role in the configuration, correlation, and communication between and among monitors. In an infrastructure setting, one or more non-monitor systems communicates with monitors and other admin stations to produce a more centralized policy and configuration control point. The centralized infrastructure may exist in a distributed manner to provide redundancy.

Figure 8:
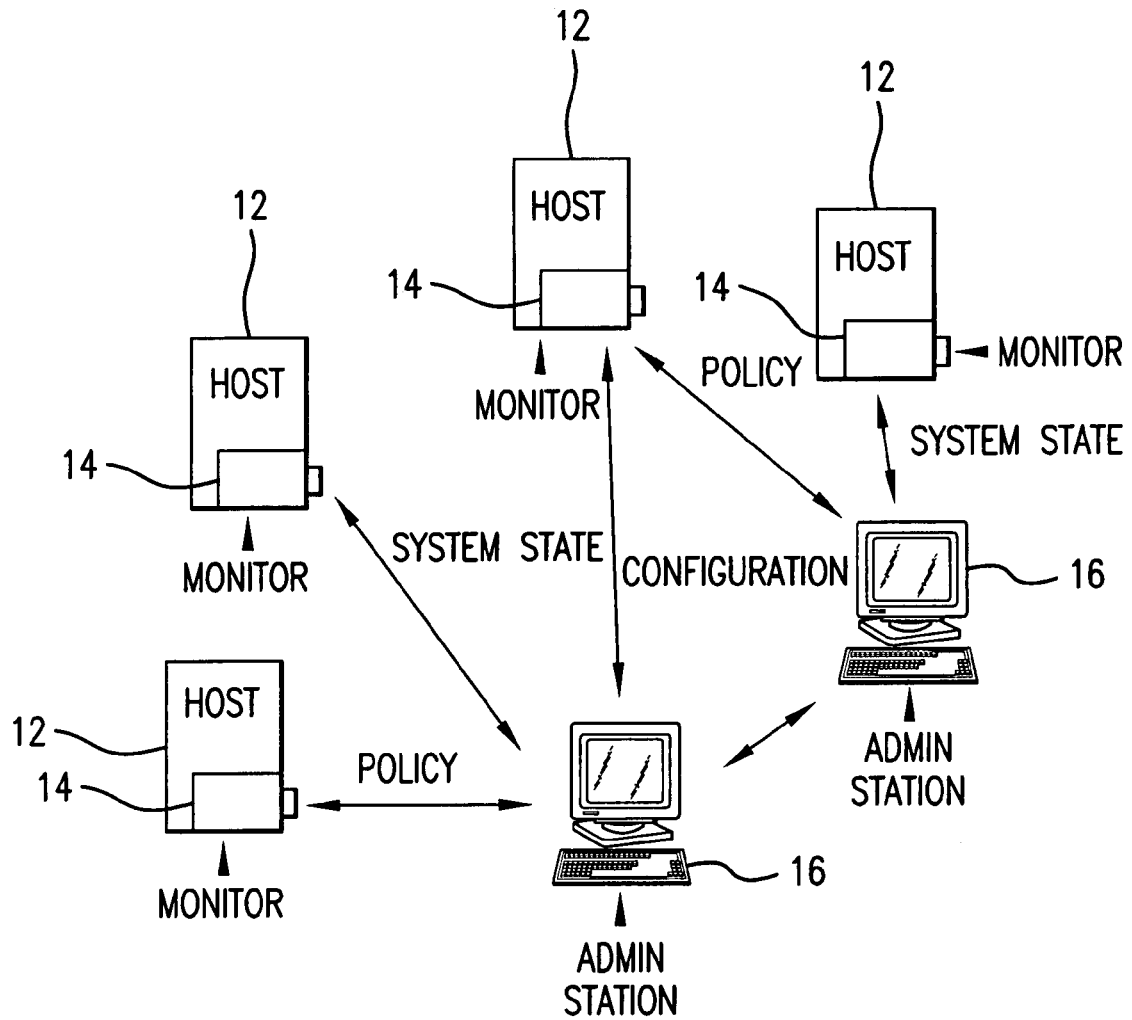
FIG. 8 illustrates schematically the monitor/administrator infrastructure architecture of the monitoring system of the present invention.

As shown in FIG. 8, admin stations 16, which may also have direct interaction with the monitored hosts 12, facilitate the changes including patch and configuration management. The admin station may push or pull policy and configuration from the monitor itself or from the host that is being monitored. This information ranges from specific configuration parameters to the complete insertion of binary or uncompiled code. Additionally, the capability for interactive control of the monitor through the admin station by a system administrator is explicitly provided. This control may be used to query the system for more information or to make specific changes.

Figure 9:
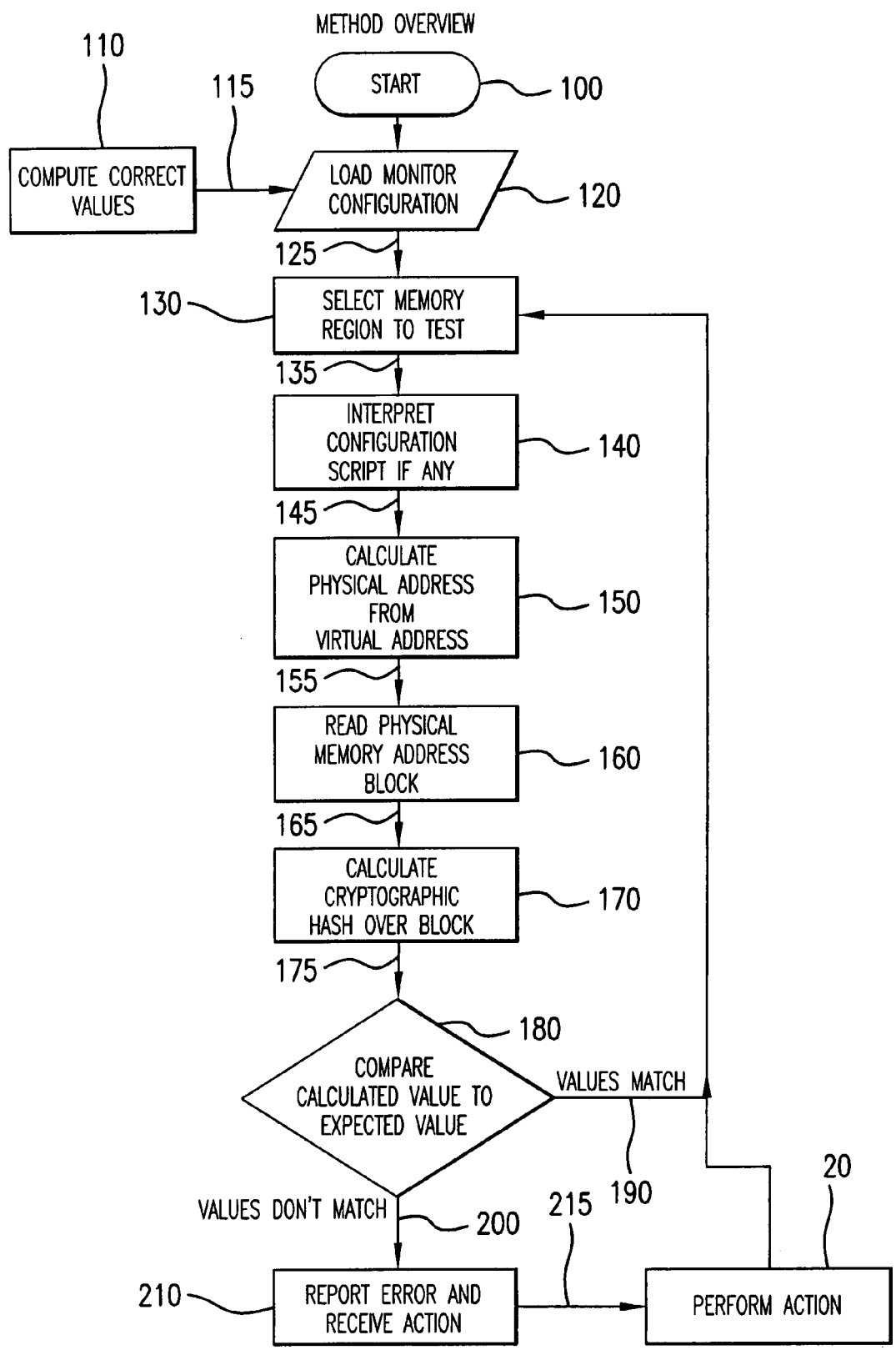
FIG. 9 is a flow-chart diagram of the software underlying the operation of the monitoring system of the present invention.
Figure 10:
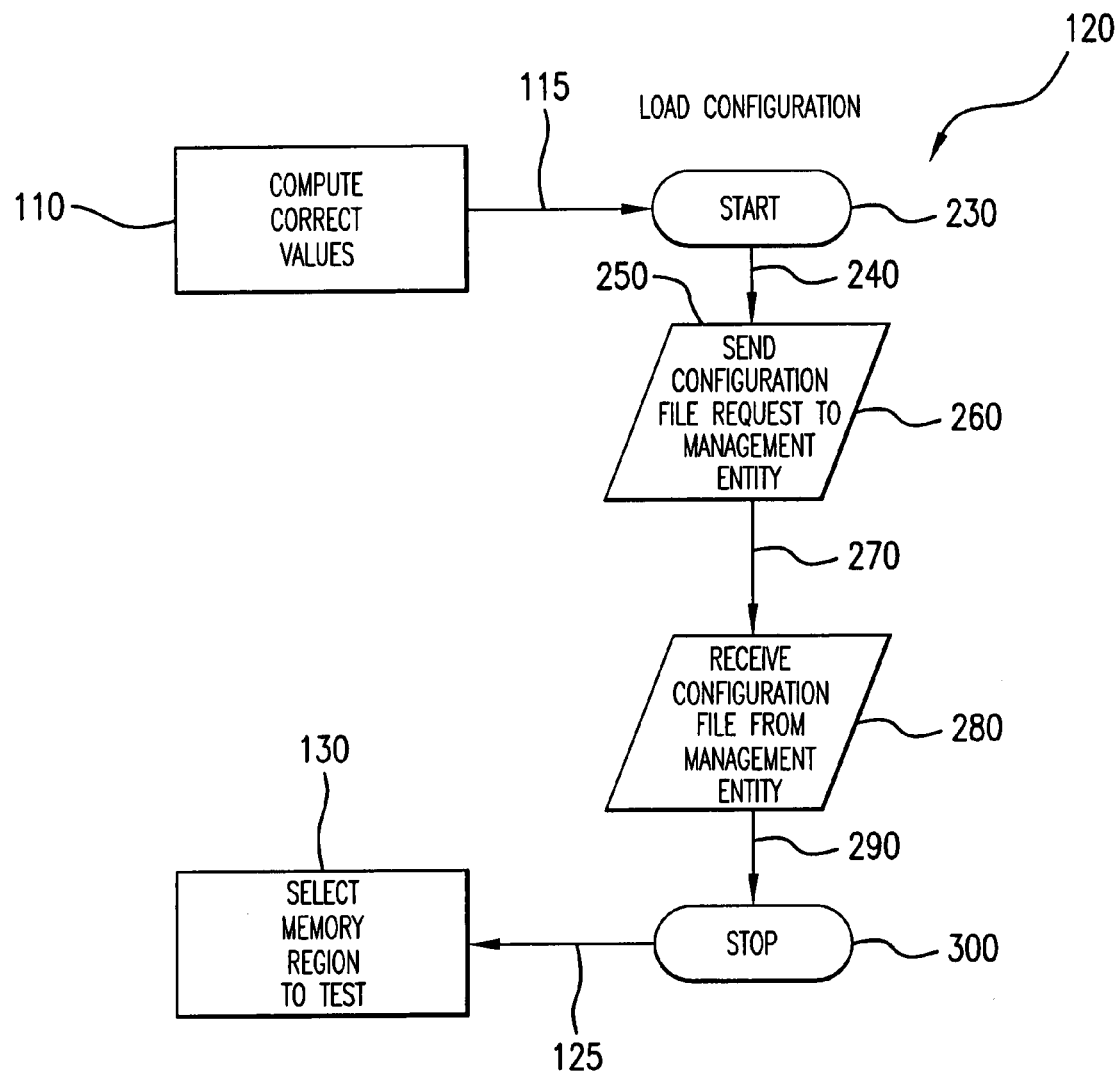
FIG. 10 is a flow-chart diagram of the "Load Configuration" sub-routine of the software of the monitoring system of the present invention.

The operation of the monitoring system 10 of the present invention is based on the software, the algorithm of which is presented as flow charts in FIGS. 9-15. As shown in FIG. 9, presenting an overview of the method of the present invention, by powering the system ON, the monitoring procedure is initiated at block 100 as any information system or embedded processor starts. Upon the monitoring procedure start, a block 120 "Load Monitor Configuration" is activated, the operational details of which are shown in FIG. 10 (Load Configuration). The loading of the monitor configuration starts at block 230 following data line 240, where the monitor 14 sends a configuration request to some management entity (for example, the administrative station 16) at block 300 "Send Configuration File Request to Management Entity". This can be done over the network, or this feature could be resident within the monitor's file system itself.

The procedure further follows via line input 270 to the block 280 "Receive Configuration File from Management Entity" where a configuration file or instructions from the management entity is received over some secure protocol, such as for example, TLS, SSL, in order to protect this information.

At this point, the monitor 14 of the present invention has the configuration file; and the logic passes on line 290 to finalize the load configuration subroutine at block 300 and further flows to block 130 "Select Memory Region to Test" of FIG. 9. The management entity used in "Load Configuration" subroutine may be the Business Logic which can be implemented, through a set of servers on the network or as a logic block on the monitor itself. Although the management entity can be resident within the monitor itself, it is also envisioned that the administrator station functions as a management entity. The configuration file can be in one of two forms: either it can be a set of data representing memory region and size, or start address size, and cryptographic cache representing that region, or the configuration files can be scriptable, e.g., they can be interpreted. In this form, software calculates some additional values to interpret a script of the configuration file. The process of interpreting configuration file script will be further described in detail in association with FIG. 12.

Referring to FIG. 9, prior to executing the logic block 120 "Load Monitor Configuration", the software computes the correct values in block 110, as presented in detail in FIG. 11. The computation of the correct values is an offline process, and since it is completed offline, it is an independent process, starting in block 305 and following through the line 310 to the block 320 "Read Baseline". The logic reads a baseline from the baseline images/files 330 which may be a memory image in RAM, or an executable file, or driver, that resides on a disk drive.

After picking up the baseline images and/or files in block 330, the logic transfers the baseline onto line 340 to the "Read Baseline" block 320. Once the baseline is read, the procedure passes on line 350 to block 360 "Select Image or File", and then the selected image or file is passed to the block 380 "Cryptographic Hash Over Baseline" block 380. From the block 380, the logic flows via the line 390 to the "Configuration Entry" block 400 where it is written through the line 410 to the disk 420. Further, the logic flows to the logic block 440 "Baseline Items Remain?" in order to provide a check as to whether there are any further baseline items remaining. If "Yes", flow loops through the line 450 to the block 360 "Select Image or File" and the process is repeated with another baseline image/file. If there is no base line item remaining, the procedure flows via the line 460 to the "Stop" block 450 to be loaded into the load monitor configuration block 120 of FIG. 9.

Referring once again to FIG. 9, from the block 120 the procedure follows to block 130 "Select Memory Region to Test" via the line 125 in order to collect the entries into the configuration file. Once the memory region to be tested has been selected in block 130, the logic flows via the line 135 to the logic block 140 "Interpret Configuration Script if Any". The subroutine "Interpret Script", as shown in FIG. 12, starts at the logic block 310 "Script Exist?" to check in which form the configuration file is presented.

If the configuration file is presented as a script to be interpreted, the logic flows from the block 310 over the line 320 to the block 330 "Evaluate Basic Expression" and further follows through line 340 to the block 350 "Output Configuration Line". The configuration line is interpreted for use, and the logic follows via the line 360 to the block 370 "Next Expression Exist?" to check the main scripts. If such an expression exists, the logic returns through line 380 to block 330 to interpret the remaining basic expressions describing the configuration files. However, if no expressions remain, the logic follows through line 400 to block 150 "Calculate Physical Address from Virtual Address".

Figure 12:
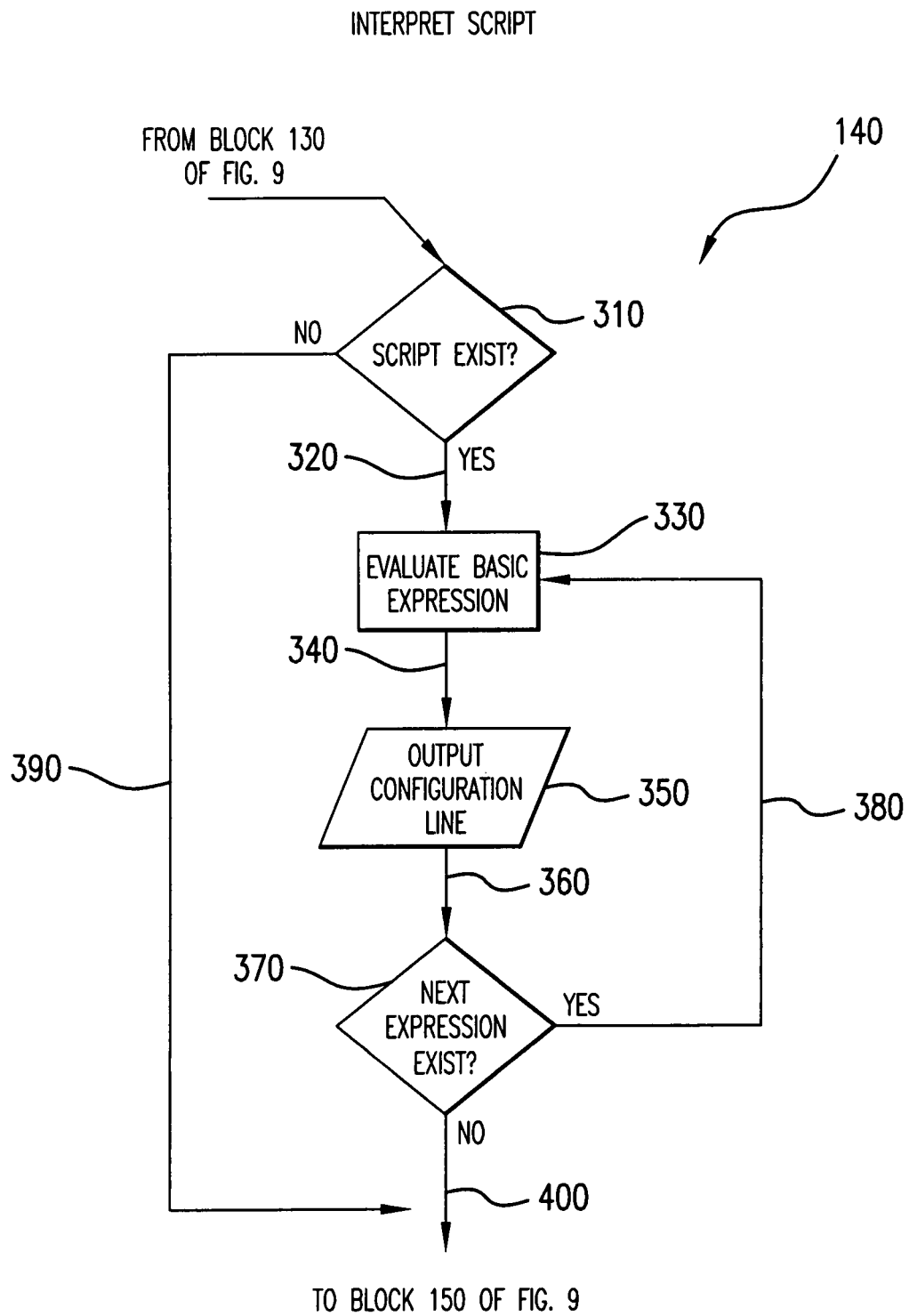
FIG. 12 is a flow-chart diagram of the "Interpret Script" sub-routine of the monitoring operation of the present invention.

As shown in FIG. 12, if another form of representation of the configuration file has been identified in block 310, the logic passes through the line 390 to the line 400 to be coupled to the block 150 of FIG. 9.

Figure 13:
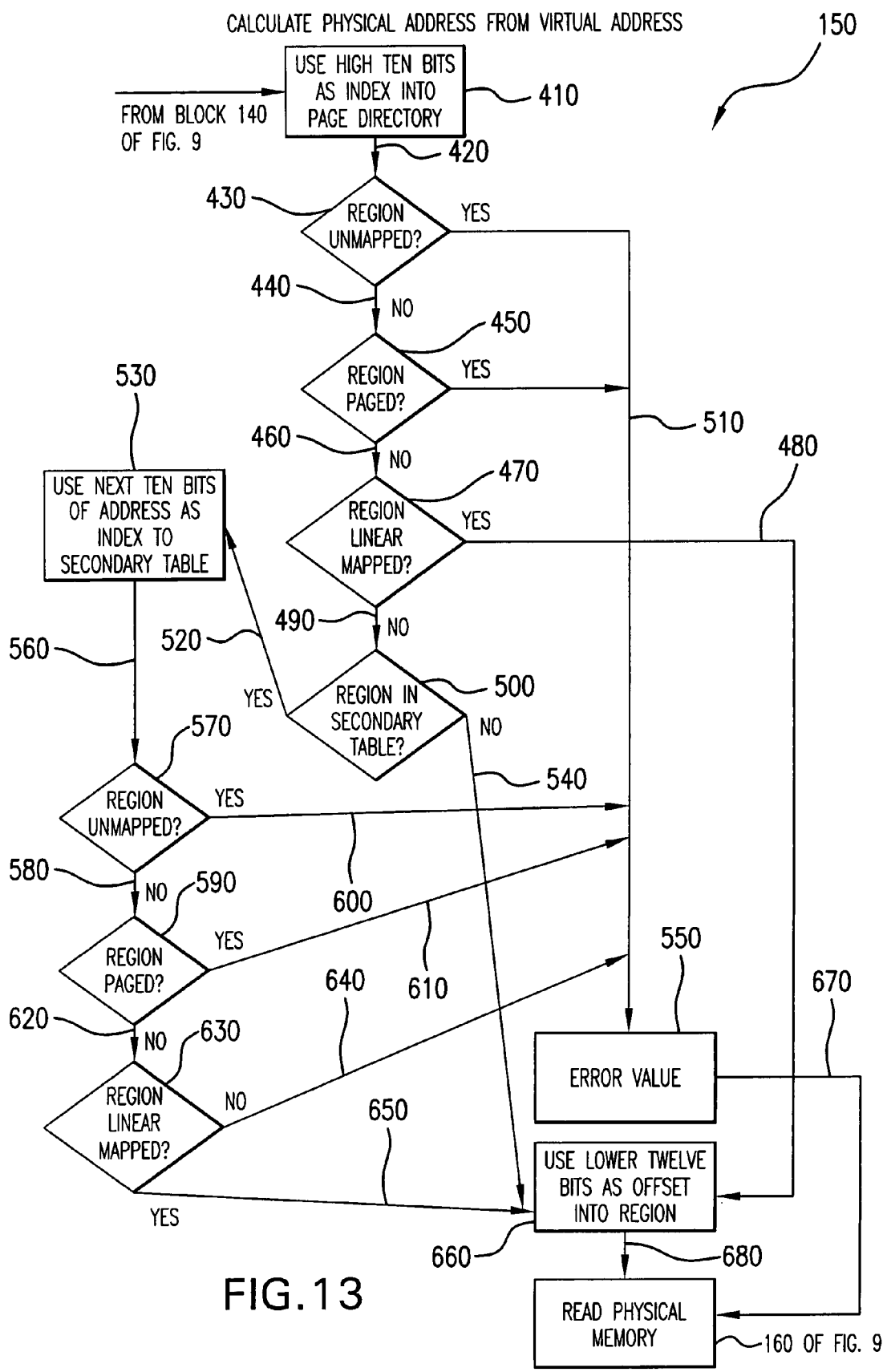
FIG. 13 is a flow-chart diagram representing the "Calculate Physical Address from Virtual Address" sub-routine of the software of the present invention.
Figure 14:
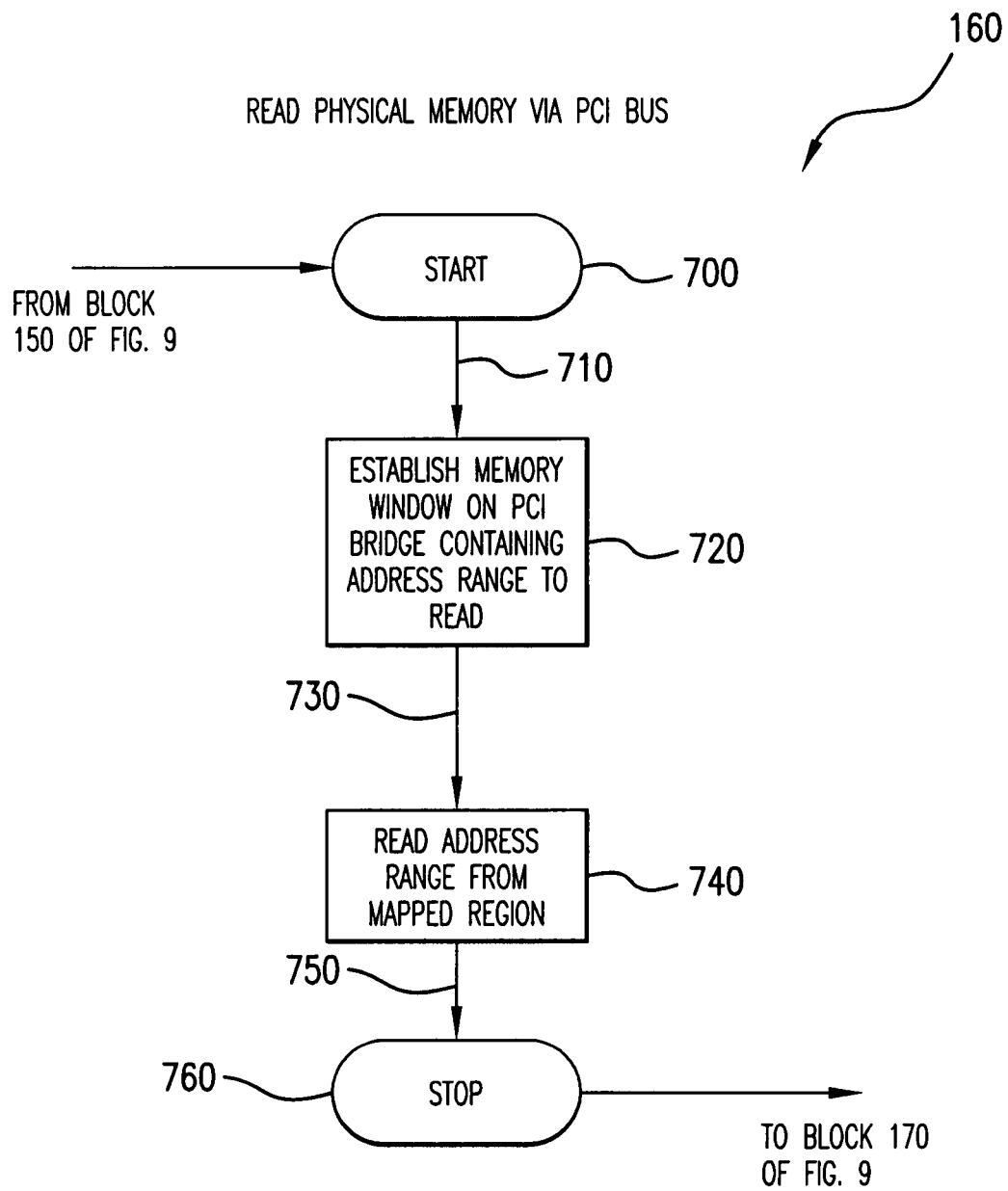
FIG. 14 is a flow-chart diagram of the "Read Physical Memory via PCI Bus" sub-routine of the method of the present invention.

Referring again to FIG. 9, from the block 140 "Interpret Configuration Script if Any", the logic flows via line 145 to the block 150 "Calculate Physical Address from Virtual Address". The detail of the translation sub-routine of the virtual addresses of the selected structure into the physical address thereof is shown in FIG. 13. The description of the Calculate Physical Address from Virtual Address, as presented in FIG. 13, should be taken in conjunction with FIG. 2 and the associated text presented supra in the present patent application.

Monitor 14 is capable of directly reading physical memory of a structure of interest but cannot do so for virtual memory. In order to read virtual memory, address translation must be used to convert virtual addresses to physical addresses as shown in FIGS. 2 and 13. This can be accomplished by reading objects in physical memory called page tables. Each page table 46, shown in FIG. 2, stores mappings from virtual to physical addresses for a single address space. The address spaces of each process are stored in separate page tables whose locations are unknown, but a master page table containing mappings for the kernel is always found at a fixed location in low physical memory. By starting with this master page table and doing address translation as described below, the kernel virtual memory can be read and kernel data structures can be traversed to discover the location of the other page tables. With this information, the monitor 14 is capable of accomplishing arbitrary virtual address translation in any address space.

Since the monitor 14 of the add-in board (shown in FIG. 1), as well as other alternative arrangements shown in FIGS. 3-6, accomplishes address translation by reading from physical memory directly, a generic description of address translation will suffice. It is to be understood however that in the implementations of FIGS. 1, and 3-6, the monitor 14 reads physical memory through DMA while in the X86 architecture the hardware does so directly.

The X86 architecture accomplishes address translation via an object called the page table, which consists of a single 4K page directory of 1024 4 B entries and up to 1024 4K page tables consisting of 1024 4 B entries each. This is a standard two-level page table in which a single page directory partitions the entire 4 g address space into 1024 pieces of 4M, each of which may have a corresponding page table which maps 1024 4K pieces in its 4M block from virtual to physical memory. It is also possible to map an entire 4M block directly from virtual memory to physical memory in the page directory.

For example, in order to figure out what virtual memory address 0x804de78c maps to, the top 10 bits (2^10 is 1024) are selected and the index of this address in the page directory, 513 (0x201) is obtained. Then index 513 in the page directory (located 513*4=2052 bytes into the page directory) is examined to find one of the following:

(1) That this 4-megabyte region is not mapped to anything, or (2) That this 4-megabyte region is paged, copy-on-write, or so forth, or (3) That this 4-megabyte region is linearly mapped to PM 0x Whatever, or (4) That this 4-megabyte region's mappings are contained in another page table located at 0x Whatever.

Considering, for example, option (4), the index must be found of this page in the page table at 0x Whatever. This will be the next 10 bits of the address, 238 (0xde). The index 238 is then examined in the page table to find one of the following:

(1) That this 4-kilobyte region is not mapped to anything, or (2) That this 4-kilobyte region is paged, copy-on-write, etc., or (3) That this 4-kilobyte region is linearly mapped to PM 0x Whatever. Assuming that (3) is true, it is now determined how the 4K region containing 0x804de78c is mapped to physical memory. If this region is mapped onto physical memory from 0x06da8000 to 0x06da8fff, and considering that the offset of 0x804de78c into the 4K region containing it is the lowest 12 bytes (2^12=4K), 0x78c, then the physical address corresponding to 0x804de78c is 0x06da878c.

As shown in FIG. 13, illustrating the above-presented principles, the sub-routine of the calculation physical address from virtual address in block 150 is initiated in block 410 "Use High 10 Bits As Index Into Page Directory" in which top 10 bits (2×10=1024) are selected and the index of this address in the page directory, 513 (0x201) is obtained. This index 513 in the page directory is then examined for one of the four options presented supra herein. The logic flows from block 410 through the line 420 to the logic block 430 "Region Unmapped?". If "yes", the routine passes to the block 550 "Error Value". If however, the region is mapped (line 440), the logic passes to the logical block 450 "Region Paged?" in which the index 513 in the page directory is examined to determine whether the region is paged, copy-on-written, etc. If "yes", the flow passes to the block 550 through the line 510. If not however, the logic flows via the line 460 (No) to the block 470 "Region Linear Mapped?" in which the index 513 in the page directory is examined to determine whether this region is linearly mapped to PM0xWhatever. If the region is not mapped linearly, the flow passes through the line 490 to the logical block 500 "Region in Secondary Table?". If however the region is mapped linearly, the logic flows from the block 470 via the line 480 to the block 660 "Use Lower 12 Bits as Offset into Region".

In block 500, the logic checks whether the region's mappings are contained in another page table located at 0xWhatever. If "yes", the logic flows from block 500 through the line 520 to the block 530 "Use Next 10 Bits of Address as Index into Secondary Table". If, however, the region is not in the secondary table, the flow passes from the block 500 through the line 540 to the block 660 "Use Lower 12 Bits as Offset into Region".

Once in block 530, when the next 10 bits of address are used as index into the secondary table, the logic flows through line 560 to block 570 "Region Unmapped?". If "yes", the flow passes to the "Error Value" block 550 through the lines 600 and 510. If "no", the software follows from the block 570 to block 590 "Region Paged?" through the line 580. There are again two options for the logic block 590. If the region is paged, the logic flows through the line 610 (Yes) to the error value block 550 through the line 510. If however the region is not paged, the flow passes through the line 620 (No) to the block 630 "Region Linear Mapped?". If the region is not mapped linearly, the flow passes to the "Error Value" block 550, through the line 640 (No) and the line 510. If the region is mapped linearly, from the block 630, the flow passes through the line 650 (Yes) to the block 660 "Use Lower 12 Bits as Offset into Region". In the case where the region is mapped linearly either as a result of routine in block 470 or 630, it is now determined how the region is mapped to physical memory. Using the offset into the region containing the lowest 12 bits, the physical address corresponding to the offset is read by flow through the line 680 to the block 160 "Read Physical Memory Address Block" of FIG. 9.

In the example of the monitoring system of the present invention implementation which is shown in FIG. 1, where the monitor 14 communicates with the main memory 34 through the PCI bus 28, the read physical memory routine starts at block 700 to follow through line 710 to block 720 "Establish Memory Window on PCI Bridge Containing Address Range to Read". It is well-known that objects may be created and shared with other applications in the same memory window (unique or existing). Each memory window allows for the definition of a unique multi-byte quadrant and since multiple memory windows can be defined in a system, the system total for shared resources can exceed a predetermined memory limitation for processes to be executed in the system. A special file created for memory window provides for a central place for memory window applications to associate their memory window IDS. In the event that there are collisions, only a change in the window file is necessary to select another memory window for the entire application.

The memory window is established, for example, by using a number of address registers on the PCI bridge, to connect a region of the monitor's memory to the region of the memory of the host system that the monitor is plugged into.

Once the memory window is established, the logic flows through the line 730 to the block 740 "Read Address Range from Mapped Region" in which a physical address on the monitor unit is read which corresponds and is translated automatically by the hardware to a physical address of the structure to examine the host system. Once the address of the monitored structure of the host system has been read in the block 740, the "Read Physical Memory" routine is finished in block 760 to further flow to block 170 "Calculate Cryptographic Hash Over Block" of FIG. 9.

In block 170, the logic runs a cryptographic hash over the block with the physical memory address read in block 160. The cryptographic hash which is known to those skilled in the art may include standard security hash algorithms such as MD5, SHA-1, SHA-256, SHA-384, or SHA-512 for computing a condensed representation of electronic data (message) of the region of memory that was read in block 160. The logic further flows through the line 165 to the logic block 180 "Compare Calculated Value to Expected Value" where the hash value calculated in block 170 over the structure of interest is compared to the hash value in the configuration file, as defined in block 120. If there is any difference and the values of the calculated hash deviate from the expected value, e.g., "known good" hash value from the configuration file, then it can serve as evidence that there is a modification that has been made in the region of the memory monitored and the logic flows through the line 200 to the block 210 "Report Error and Receive Action" in which the error report is sent to the administrative station through the independent communication link as shown in FIGS. 1, 3 and 4.

If the values match, meaning that the monitored structure has not been changed, the logic flows through the line 190 to the block 130 to repeat the process again for another structure to be examined. As the report has been sent from the monitor to the managing entity (either across the network to the administrative station or it can be resident within the monitor itself), the management entity checks the calculated hash in a data base to determine whether this hash value has been seen before, whether it corresponds to a known virus or known attacker action, or the hash value is the result of the action of the administrative entity which could install a new patch, thus causing the change of the hash value which is not an error. When the management entity examines the hash value the following options are seen:

(a) the hash value is known and it is indicative of malicious modifications of the host system's examined structure, (b) the hash value is known and it is an intended change by the management entity, or (c) the hash value is not known at all.

Figure 15:
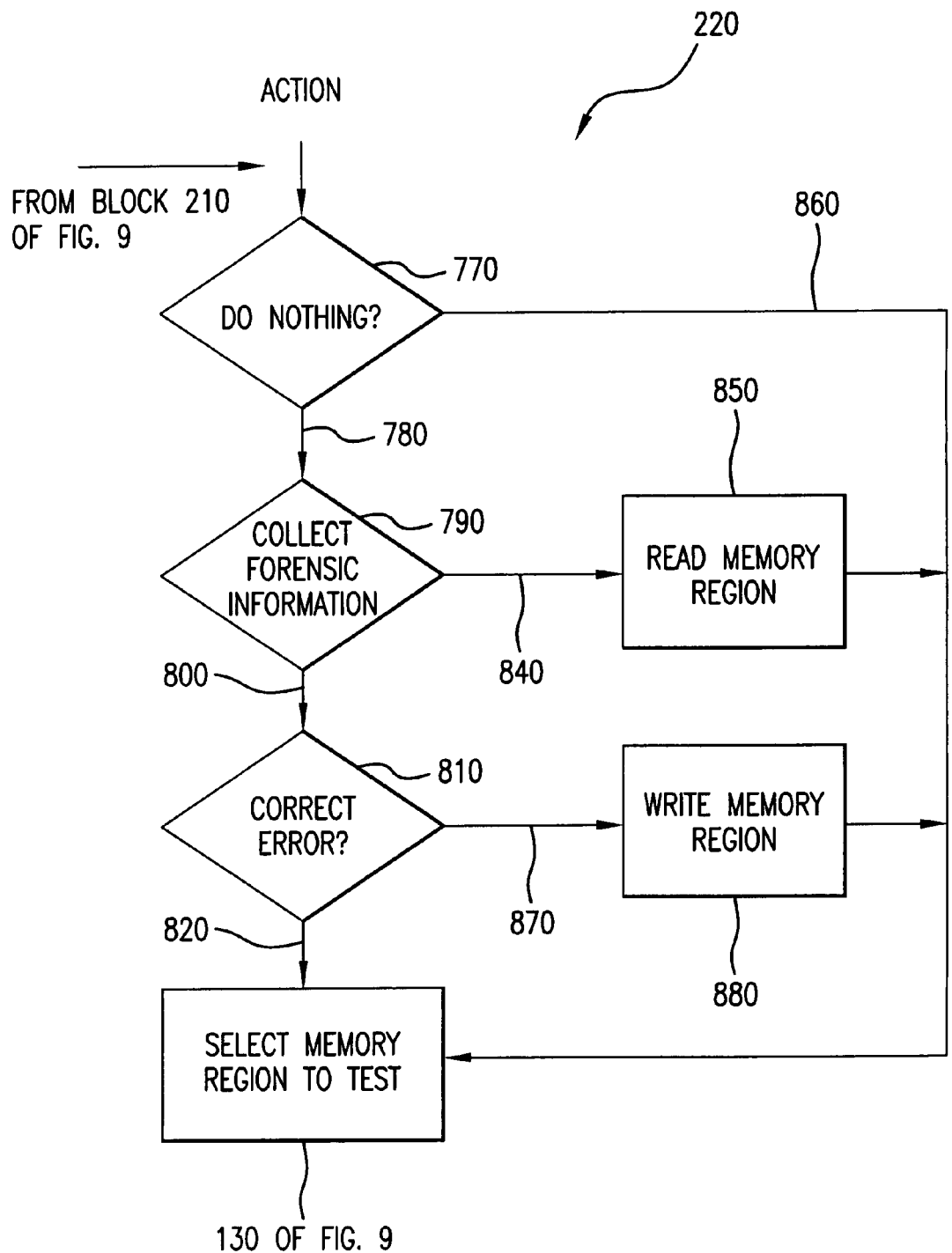
FIG. 15 is a flow-chart diagram representing the "Action" sub-routine of the operation of the monitoring system of the present invention.

To respond to the issued error report in block 210, the logic flows through the line 215 to block 220 "Perform Action" in which a routine shown in FIG. 15 is performed. The management entity decides in block 770 "Do Nothing?", whether an action should be performed or not. If the management entity upon examining the hash value in the look-up table decides that no action should be made, the logic flows from the block 770 through the line 860 to the block 130 of FIG. 9 "Select Memory Region to Test" in order to perform the monitoring procedure on another structure to be examined.

If however the management entity decides in block 770 of FIG. 15 to perform some action, there are several options available for the management entity, such as to enter into a Business Logic to decide whether more forensic information is needed to be collected, or the machine is to be shut down, or another type of monitoring is to be applied to the examined structure which has been modified.

In order to collect more additional information to determine what modifications have been made to the examined structure, the logic flows through the line 780 to the block 790 "Collect Forensic Information". In order to collect more information, the logic passes from block 790 through the line 840 to the block 850 "Read Memory Region", and then through the line 860 to block 130 "Select Memory Region to Test" in which the selected region is tested and more forensic information is collected for the management entity to study.

Another option available for the management entity is to repair the damage made to the examined structure. Since the system of the present invention monitors invariants, the recovery process is substantially the inverse of the monitoring process. To repair the damage, the system WRITES rather than READS the invariant back to its proper location. The logic flows from the block 790 to the block 810 "Correct Error?" through the line 800 in which the logic passes through the line 870 to the block 880 "Write Memory Region" in which the section of memory corresponding to "known good" tested memory region is written upon the damaged monitored structure by means of the direct correction or indirect correction as was discussed in previous paragraphs.

Upon completion of the repair of the damaged memory region in block 880, the logic flows through the line 860 to block 130 for selection of another memory region to test. However, if in the block 810, the decision has been made not to correct the error, the logic flows through the line 820 to block 130 of FIG. 9 to select another memory region to test and monitor this selected memory region as was described supra herein.

Either implemented on a separate PCI add-in card as shown in FIG. 1, which communicates with the host station via the PCI local bus, or as a monitor that is positioned on the motherboard of the host system, as shown in FIGS. 3 and 3A, or in the arrangement where the monitor resides on one of the virtual CPU while the monitored system resides on another virtual CPU, multiplexed by the domain manager, the monitor of the present invention demonstrates the advantages of the monitoring of the integrity of host resources of interest (such as operating systems, applications, domain manager, etc.), since the monitor software runs entirely in isolation and separated from the host monitored structure, and thus does not rely on the correctness of the monitored host. This monitoring technique is resistant to tampering from the host. Consequently, the novel monitor can correctly detect malicious modifications to memory, kernel, overall operating system, applications, domain manager, etc., even on hosts with operating systems too thoroughly compromised to allow the correct execution of traditional integrity monitoring software. The monitor 14 does not require any modifications to the host's software and can therefore be applied to commodity systems.

The monitor prototype has proven to be an effective kernel integrity monitor in tests against twelve common kernel-modifying rootkits. In its default configuration, the monitor of the present invention can detect changes to a host kernel's text, LKM text, or system covector within 30 seconds of being made by a rootkit. Its monitoring activities do not require the constant support of the host kernel and cause minimal, for example, below 1% throughput performance penalty on a 90-client webstone webserver benchmark. Because its hashing based approach detects changes in general, rather than focusing on the specific symptoms of a well-known set of rootkits, the monitor can detect both known rootkits and new rootkits not seen previously.

Although this invention has been described in connection with specific forms and embodiments thereof, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular locations of elements may be reversed or interposed, all without departing from the spirit or scope of the invention as defined in the appended Claims.

What is claimed is:

1. A method for monitoring at least one host system with a monitoring system including at least one monitor unit, the method comprising:
   calculating a hash value of at least one monitored structure of the at least one host system by using said at least one monitor unit, wherein the at least one monitor unit is configured to monitor integrity of the at least one monitored structure and operates independently of a processor and an operating system of the at least one host system, the at least one monitor unit is part of the at least one host system; and
   if the hash value deviates from a predetermined hash value, performing a corrective action comprising restoring at least a portion of the at least one monitored structure,
   partitioning said processor of said at least one host system into at least first and second processor regions,
   locating said at least one monitor unit on said first processor region, and locating said at least one monitored structure on said second processor region;
   said at least first and second processor regions representing virtual co-processors independent each from the other,
   wherein the at least one monitored structure comprises a main memory of the at least one host system.

2. The method of claim 1, further comprising the step of: monitoring by said at least one monitor unit a Domain Manager system of said at least one host system.

3. The method of claim 1, wherein said at least one monitor unit is based on a co-processor and wherein said at least one host system includes a Peripheral Component Interconnect (PCI) bus, the method further comprising the steps of:
   connecting said at least one monitor unit to said at least one host system through said PCI bus, and
   making a Direct Memory Access (DMA) request for said at least one monitored structure over the PCI bus of said at least one host system.

4. The method of claim 1, wherein said at least one monitor unit is based on a co-processor, further comprising the steps of:
   locating said at least one monitor unit on a motherboard of said at least one host system, and
   coupling said at least one monitor unit to said at least one monitored structure via a local bus.

5. The method of claim 1, further comprising the steps of:
   multiplexing said host system's processor by a Domain Manager System to partition said processor into said first and second processor regions, and at least a third processor region,
   residing said at least one monitor unit within said Domain Managing System, and
   allocating said at least third processor region to said Domain Manager System.

6. The method of claim 1, wherein said at least one monitored structure includes a physical address space and a virtual address space, the method further comprising the steps of:
   translating, by said at least one monitor unit, a virtual address of said at least one monitored structure into the physical address thereof prior to making a request for said at least one monitored structure to be examined; and
   specifying, by said at least one monitor unit, an address of said at least one monitored structure in terms of said physical address.

7. The method of claim 6, wherein said at least one monitored structure includes a dynamically-allocated data structure, the method further comprising the steps of:
   retrieving page tables maintained in said virtual address space via Direct Memory Access (DMA), and
   translating the virtual address into the physical address of said at least one monitored structure in accordance with said page tables.

8. The method of claim 3, further comprising the steps of:
   arranging said at least one monitor unit as a single-board computer on a Peripheral Component Interconnect (PCI) add-in card, and
   attaching said add-in card to the Peripheral Component Interconnect (PCI) bus of said at least one host system.

9. The method of claim 1, further comprising the step of: calculating said hash values at randomized time intervals.

10. The method of claim 1, further comprising the step of:
    identifying, by said at least one monitor unit, a foreign text added to an empty portion of said at least one monitored structure.

11. The method of claim 1, further comprising the step of:
    monitoring, by said at least one monitor unit, regions of said at least one monitored structure where malicious instructions may be added to execute a foreign text.

12. The method of claim 1, wherein said at least one monitored structure includes kernel, having static kernel memory, semi-static kernel data, and dynamic kernel data, said method further comprising the steps of:
    monitoring changes to said static kernel memory or to said semi-static kernel data, or
    detecting anomalies in said dynamic kernel data.

13. A system for monitoring the integrity of at least one host system, the system comprising:
    at least one monitor unit operating independently of a processor and an operating system of at least one host system, the at least one monitor unit is part of the at least one host system, said at least one monitor unit configured to:
       make a Direct Memory Access (DMA) request of at least one monitored structure of the at least one host system, and
       calculate hash values of the at least one monitored structure to detect changes made thereto;
    a multiplexing structure partitioning the host system's processor into at first processor region and a second processor region, wherein said at least one monitor unit resides on said first processor region, and said at least one monitored structure resides on said second processor region, said at least first and second processor regions representing virtual co-processors independent each from the other.

14. The system of claim 13, wherein said at least one monitor unit is a co-processor based single-board computer arranged on a Peripheral Component Interconnect (PCI) add-in card, said add-in card being attached to the Peripheral Component Interconnect (PCI) bus of said at least one host system.

15. The system of claim 13, wherein said at least one monitor unit is a co-processor based monitor unit residing on a motherboard of said at least one host system.

16. The system of claim 13, wherein said multiplexing structure creates at least a third processor region of said host system's processor, said multiplexing structure residing on said third processor region, and said at least one monitor unit residing in said multiplexing structure.

17. The system of claim 13, wherein said at least one monitored structure is a structure of said at least one host system from the group consisting of: a main memory, an operating system, an applications system, and a Domain Manager system.

18. The system of claim 13; further comprising a bridge/memory controller coupled between said at least one monitor unit and said at least one host system's memory for Direct Memory Access to said memory.

19. The system of claim 13, further comprising a bridge/memory controller unit coupled to said at least one host system's memory, said at least one monitor unit residing in said bridge/memory controller unit.

20. The system of claim 13, further comprising a translation unit for translating virtual address of said at least one monitored structure into the physical address thereof prior to making a request for said at least one monitored structure to be examined.

21. The system of claim 13, further comprising an error correction unit for replacing detected malicious modifications made to said at least one monitored structure with a correct text/data.

22. The system of claim 13, wherein said at least one monitor unit is coupled to said at least one monitored structure through a bus, said at least one monitor unit comprising a device-specific functionality unit to monitor predetermined features of devices connected to said bus.

23. The method of claim 1, wherein the at least one monitored structure comprises a kernel data structure and the restoring comprises restoring at least a portion of the kernel data structure.

24. The method of claim 23, wherein the at least a portion of the kernel data structure comprises at least one of a system call table and/or a static jump table.

25. The method of claim 1, wherein the monitoring system further includes at least one administrative system coupled to the at least one monitor unit through a communication link independent of the at least one host system, and the method further comprises:
transmitting a report to said at least one administrative system by said at least one monitor unit via said communication link on said hash value of said at least one monitored structure.

26. The system of claim 13, further comprising:
at least one administrative system connected to said at least one monitor unit through an independent communication link and configured to receive therefrom reports once changes to said at least one monitored structure have been detected.

27. A method for monitoring the integrity of at least one host system by using a monitoring system comprising at least one monitor unit, the method comprising:
retrieving, via Direct Memory Access (DMA), at least one monitored structure of the at least one host system;
calculating at least one hash value of the at least one monitored structure to detect changes made thereto; and
if the at least one hash value differs from a predetermined hash value, sending an error report, wherein
the monitor unit is part of the host system and is configured to operate independently of a processor and an operating system of the at least one host system, wherein the processor of the host system is partitioned into at least two regions, wherein the monitor unit is located on a first processor region and the at least one monitored structure located on a second processor region, wherein the first and second processor regions represent virtual co-processors independent each from the other.

28. The method of claim 25, further comprising the steps of:
analyzing said report at said at least one administrative system, and
formulating an action based on whether said hash value deviates from a predetermined hash value, said action including an action from the group consisting of skipping the action, collecting forensic information, and repairing a modification detected in said at least one monitored structure.

29. The system of claim 26, wherein:
the at least one host system comprises a plurality of host systems,
the at least one monitor unit comprises a plurality of monitor units, each said monitor unit monitoring a respective host system, and
the at least one administrative system comprises a plurality of said administrative systems, and wherein said plurality of the monitor units are connected in a peer-to-peer fashion each to the other and are configured to share information about the state of each said monitored host systems.

30. The system of claim 26, further comprising an analyzing unit for processing said reports and for undertaking a corresponding action.

31. The method of claim 28, further comprising the step of:
sending a request from said at least one administrative system to the at least one host system to repair the modifications detected in said at least one monitored structured.

* * * * *